US008814372B2

(12) United States Patent
Vandal et al.

(10) Patent No.: US 8,814,372 B2
(45) Date of Patent: Aug. 26, 2014

(54) STIFFENING MEMBERS FOR REFLECTORS USED IN CONCENTRATING SOLAR POWER APPARATUS, AND METHOD OF MAKING SAME

(75) Inventors: Robert A. Vandal, Syracuse, IN (US); Duane O. Recker, Auburn, IN (US)

(73) Assignee: Guardian Industries Corp., Auburn Hills, MI (US)

( * ) Notice: Subject to any disclaimer, the term of this patent is extended or adjusted under 35 U.S.C. 154(b) by 1525 days.

(21) Appl. No.: 12/285,571

(22) Filed: Oct. 8, 2008

(65) Prior Publication Data

US 2009/0101208 A1   Apr. 23, 2009

Related U.S. Application Data

(63) Continuation-in-part of application No. 11/639,436, filed on Dec. 15, 2006, now Pat. No. 7,871,664, which is a continuation-in-part of application No. 11/416,388, filed on May 3, 2006, now abandoned, and a continuation-in-part of application No. 11/387,045, filed on Mar. 23, 2006, now abandoned, and a continuation-in-part of application No. 11/452,418, filed on Jun. 14, 2006, now abandoned.

(51) Int. Cl.
*G02B 7/182* (2006.01)
*F24J 2/10* (2006.01)
*F24J 2/52* (2006.01)

(52) U.S. Cl.
CPC *F24J 2/526* (2013.01); *Y02E 10/45* (2013.01); *Y02E 10/47* (2013.01)
USPC .......................................... 359/871; 126/696

(58) Field of Classification Search
USPC .......................................... 126/696; 359/871
See application file for complete search history.

(56) References Cited

U.S. PATENT DOCUMENTS 3,798,050 A    3/1974 Franz et al.
4,056,313 A    11/1977 Arbogast
(Continued)

FOREIGN PATENT DOCUMENTS

DE    26 38 032    3/1978
EP    0 026 883    4/1981
(Continued)

OTHER PUBLICATIONS

European Office Action dated May 9, 2011.
(Continued)

*Primary Examiner* — Alicia M Harrington
*Assistant Examiner* — Cara Rakowski
(74) *Attorney, Agent, or Firm* — Nixon & Vanderhye P.C.

(57) ABSTRACT

In certain example embodiments, a solar collector system including a plurality of reflectors is provided. Each reflector has a stiffening rib associated therewith and is attached thereto on a side facing away from the sun. At least one area on each stiffening rib is suitable for accommodating a polymer-based adhesive for bonding the rib to a side of the associated reflector facing away from the sun. Each stiffening rib is formed so as to substantially match a contour of the associated reflector. At least two of each rib, the associated reflector, and the adhesive have respective coefficients of thermal expansion within about 50% of one another. Each stiffening rib is sized and positioned on the associated reflector so as to increase an EI value thereof at least about 10 times or to at least about 9,180 pascal meters$^4$. Methods of making the same also are provided in certain example embodiments.

21 Claims, 12 Drawing Sheets

(56) References Cited

U.S. PATENT DOCUMENTS

| | | | |
|---|---|---|---|
| 4,059,094 A | 11/1977 | Barrio de Mendoza | |
| 4,114,597 A * | 9/1978 | Erb | 126/665 |
| 4,117,682 A | 10/1978 | Smith | |
| 4,161,942 A | 7/1979 | Monk | |
| 4,237,864 A | 12/1980 | Kravitz | |
| 4,238,265 A | 12/1980 | Deminet | |
| 4,239,344 A | 12/1980 | Wildenrotter | |
| 4,268,332 A | 5/1981 | Winders | |
| 4,429,953 A | 2/1984 | Zephnpfennig et al. | |
| 4,432,343 A * | 2/1984 | Riise et al. | 126/602 |
| 4,511,618 A | 4/1985 | Duchene et al. | |
| 4,571,812 A * | 2/1986 | Gee | 29/445 |
| 4,608,964 A | 9/1986 | Russo | |
| 5,129,934 A | 7/1992 | Koss | |
| 5,195,503 A | 3/1993 | Ludlow | |
| 5,275,149 A | 1/1994 | Ludlow | |
| 5,347,402 A | 9/1994 | Arbogast | |
| 5,472,469 A | 12/1995 | Yli-Vakkuri et al. | |
| 5,501,717 A | 3/1996 | Vehmas | |
| 5,702,649 A | 12/1997 | Taylor | |
| 5,956,191 A | 9/1999 | Blackmon et al. | |
| 6,251,482 B1 | 6/2001 | Laroche et al. | |
| 6,783,253 B2 | 8/2004 | Thomsen et al. | |
| 6,852,300 B2 | 2/2005 | Costa et al. | |
| 6,872,765 B1 | 3/2005 | Betz et al. | |
| 6,927,186 B2 | 8/2005 | Hulme et al. | |
| 6,934,085 B2 | 8/2005 | Stachowiak et al. | |
| 6,943,123 B2 | 9/2005 | Ruldolph et al. | |
| 6,983,104 B2 | 1/2006 | Longobardo et al. | |
| 7,030,047 B2 | 4/2006 | Landa et al. | |
| 7,144,837 B2 | 12/2006 | Landa et al. | |
| 2002/0086164 A1 | 7/2002 | Anzaki et al. | |
| 2003/0177792 A1 | 9/2003 | Longobardo et al. | |
| 2003/0179454 A1 | 9/2003 | Thomsen et al. | |
| 2004/0118395 A1 | 6/2004 | Rubbia et al. | |
| 2005/0083576 A1 | 4/2005 | Stachowiak et al. | |
| 2005/0275924 A1 | 12/2005 | Longobardo et al. | |
| 2007/0223096 A1 | 9/2007 | O'Connor et al. | |

FOREIGN PATENT DOCUMENTS

| | | |
|---|---|---|
| JP | 63-223601 | 9/1988 |
| WO | WO 2007/087680 | 8/2007 |
| WO | WO 2007/109900 | 10/2007 |

OTHER PUBLICATIONS

U.S. Appl. No. 11/639,436, filed Dec. 15, 2006; O'Connor et al.
U.S. Appl. No. 11/416,388, filed May 3, 2006; Franck et al.
U.S. Appl. No. 11/387,045, filed Mar. 23, 2006; Franck et al.
U.S. Appl. No. 11/452,418, filed Jun. 14, 2006; Wang.

* cited by examiner

US 8,814,372 B2

STIFFENING MEMBERS FOR REFLECTORS USED IN CONCENTRATING SOLAR POWER APPARATUS, AND METHOD OF MAKING SAME

CROSS-REFERENCE TO RELATED APPLICATIONS

This application is a continuation-in-part (CIP) Ser. No. 11/639,436, filed Dec. 15, 2006 now U.S. Pat. No. 7,871,664, which is a CIP of each of U.S. Ser. No. 11/416,388, filed May 3, 2006 now abandoned, Ser. No. 11/387,045, filed Mar. 23, 2006 now abandoned, and Ser. No. 11/452,418, filed Jun. 14, 2006 now abandoned, the disclosures of which are hereby incorporated herein by reference.

FIELD OF THE INVENTION

Certain example embodiments of this invention are related to a reflector (e.g., mirror) for use in a solar collector or the like. More particularly, certain example embodiments of this invention are related to one or more stiffening member(s) connected to a reflector (e.g., mirror) for use in a solar collector or the like.

BACKGROUND AND SUMMARY OF EXAMPLE EMBODIMENTS OF THE INVENTION

Solar collectors are known in the art. Example solar collectors are disclosed in U.S. Pat. Nos. 5,347,402, 4,056,313, 4,117,682, 4,608,964, 4,059,094, 4,161,942, 5,275,149, 5,195,503 and 4,237,864, the disclosures of which are hereby incorporated herein by reference. Solar collectors include at least one mirror (e.g., parabolic or other type of mirror) that reflects incident light (e.g., sunlight) to a focal location such as a focal point. In certain example instances, a solar collector includes one or more mirrors that reflect incident sunlight and focus the light at a common location. For instance, a liquid to be heated may be positioned at the focal point of the mirror(s) so that the reflected sunlight heats the liquid (e.g., water, oil, or any other suitable liquid) and energy can be collected from the heat or steam generated by the liquid.

FIG. 1 is a schematic diagram of a conventional solar collector, or a part thereof, where a parabolic mirror 1 reflects incident light (or radiation) from the sun 3 and focuses the reflected light on a black body 5 that absorbs the energy of the sun's rays and is adapted to transfer that energy to other apparatus (not shown). By way of example only, the black body 5 may be a conduit through which a liquid or air flows where the liquid or air absorbs the heat for transfer to another apparatus. As another example, the black body 5 may be liquid itself to be heated, or may include one or more solar cells in certain example instances.

FIG. 2 is a cross sectional view of a typical mirror used in conventional solar collector systems. The mirror of FIG. 2 includes a reflective coating 7 supported by a single bent glass substrate 9, where the glass substrate 9 is on the light incident side of the reflective coating 7 (i.e., the incident light from the sun must pass through the glass before reaching the reflective coating). This type of mirror is a second or back surface mirror. Incoming light passes through the single glass substrate 9 before being reflected by the coating 7; the glass substrate 9 is typically from about 4-5 mm thick. Thus, reflected light passes through the glass substrate twice in back surface mirrors; once before being reflected and again after being reflected on its way to a viewer. Second or back surface mirrors, as shown in FIG. 2, are used so that the glass 9 can protect the reflective coating 7 from the elements in the external or ambient atmosphere in which the mirror is located (e.g., from rain, scratching, acid rain, wind-blown particles, and so forth).

Conventional reflectors such as that shown in FIG. 2 are typically made as follows. The single glass substrate 9 is from about 4-5 mm thick, and is heat-bent using temperatures of at least about 580 degrees C. The glass substrate 9 is typically heat/hot bent on a parabolic mold using such high temperatures, and the extremely high temperatures cause the glass to sag into shape on the parabolic mold. After the hot bent glass is permitted to cool to about room temperature, a reflective coating (e.g., silver based reflective coating) is formed on the bent glass substrate. Ceramic pads may then be glued to the panel which may be bolted to a holding structure of the solar collector.

Unfortunately, the aforesaid process of manufacturing reflectors is problematic for at least the following reasons. First, reflectance of the product shown in FIGS. 1-2 is less than desirable, and could be subject to improvement (i.e., it would be desirable to increase the reflectance). Second, during the manufacturing process, it is necessary to mirror-coat a 4-5 mm thick pre-bent glass sheet (a 4-5 mm thick pre-bent glass sheet will not sag flat during the mirror-coating process), and applying such coatings to bent glass is difficult at best and often leads to reduced reflective/mirror quality.

Thus, it will be appreciated that there exists a need in the art for a more efficient technique for making bent reflective coated articles, and/or for a more efficient mirror for use in solar collectors or the like. An example of such an article is a mirror which may be used in solar collector applications or the like.

In certain example embodiments of this invention, a parabolic trough or dish reflector/mirror laminate for use in a concentrating solar power apparatus is made by: (a) forming a reflective coating on a thin substantially flat glass substrate (the thin glass substrate may or may not be pre-bent prior to the coating being applied thereto; if the thin glass substrate is pre-bent prior to application of the coating thereon then its thin nature and large size/weight will permit the glass to sag so as to be flat or substantially flat in the coating apparatus when the coating is applied thereto, such that the coating is still applied to a flat or substantially flat glass substrate even though it may have been pre-bent), (b) optionally, if the thin glass substrate in (a) was not pre-bent, cold-bending the thin glass substrate with the reflective coating thereon; and (c) applying a plate or frame member to the thin bent glass substrate with the coating thereon from (a) and/or (b), the plate or frame member (which may be another thicker pre-bent glass sheet, for example) for maintaining the thin glass substrate having the coating thereon in a bent orientation in a final product. It is noted that (b) and (c) may be performed at the same time, or in entirely different steps, in different example embodiments of this invention. For example, the thin glass substrate with the coating thereon may be cold-bent when it is pressed against the plate or frame member during the laminating process, so that (b) and (c) would be performed right after one another or at essentially the same time. Alternatively, the thin glass substrate with the reflective coating thereon may be cold-bent and after the cold bending could be brought to and coupled with the plate or frame member. The reflective coating may be a single layer coating, or a multi-layer coating, in different example embodiments of this invention.

In certain example embodiments, the mirror/reflector laminate is a parabolic dish or trough type reflector and reflects incident sunlight (e.g., visible and/or IR radiation) and focuses the same at a common location. For instance, a liquid to be heated may be positioned at the focal point of the parabolic mirror(s) so that the reflected sunlight heats the liquid (e.g., water, oil, or any other suitable liquid) and energy can be collected from the heat or steam generated by the liquid.

In certain example embodiments of this invention, when the thin glass substrate is not pre-bent prior to forming the reflective coating thereon, the thin glass substrate with the reflective coating thereon may in (b) be cold-bent at a temperature of no more than about 200 degrees C., more preferably no more than about 150 degrees C., more preferably no more than about 100 degrees C., even more preferably no more than about 75 degrees C., still more preferably no more than about 50 degrees C., still more preferably no more than about 40 or 30 degrees C. The cold-bent thin glass substrate with the reflective coating thereon may then be laminated to the plate or frame member (which may be another thicker pre-bent glass sheet, for example) for maintaining the coated glass substrate in a bent orientation in a final product.

In certain example embodiments, the plate or frame member may be flat and may be applied to the thin glass substrate prior to bending thereof. Then, the plate member (e.g., of glass, thermoplastic, or the like) and the thin glass substrate can be bent together with the plate or frame member optionally being pre-heated to permit more efficient bending thereof. In certain example embodiments of this invention, the plate or frame member may be another glass substrate/sheet that is thicker than the thin glass substrate having the reflective coating thereon, and may optionally have been pre-bent (e.g., via hot bending) prior to being laminated to the thin glass substrate and/or reflective coating. The pre-bent (via hot-bending) thick glass substrate/sheet may be laminated/adhered to the thin glass substrate with the reflective coating thereon via an adhesive/laminating layer which is typically polymer based (e.g., PVB, or any other suitable polymer inclusive adhesive).

In certain example embodiments, the reflective coating may be designed so as to better adhere to a polymer based adhesive/laminating layer that is used to couple the plate member (e.g., glass sheet) to the thin glass substrate. For example, in certain example embodiments, the reflective coating is a mirror coating and includes a passivating film comprising copper, tin oxide, and/or silane(s), optionally with paint thereon, for good adhering to the polymer based adhesive/laminating layer which may be made of polyvinyl butyral (PVB) or the like.

In certain example embodiments of this invention, there is provided a method of making a mirror for use in a concentrating solar power apparatus, the method comprising: bending a thick glass substrate having a thickness of at least 2.0 mm into a desired bent shape so as to form a pre-bent thick glass substrate; forming a mirror coating on a thin glass substrate having a thickness of from about 1.0 to 2.0 mm, the mirror coating being formed on the thin glass substrate when the thin glass substrate is in a substantially flat shape; and after the mirror coating has been formed on the thin glass substrate, laminating the thin glass substrate to the pre-bent thick glass substrate using at least one polymer inclusive adhesive layer to form a laminate mirror comprising a substantially parabolic shape, wherein the laminate mirror is used in a concentrating solar power apparatus and has a solar reflectance of at least 90%.

In certain other example embodiments of this invention, there is provided a method of making a mirror for use in a concentrating solar power apparatus, the method comprising: bending a thick glass substrate into a desired bent shape so as to form a pre-bent thick glass substrate; forming a mirror coating on a thin glass substrate, the mirror coating being formed on the thin glass substrate when the thin glass substrate is in a substantially flat shape; wherein the thin glass substrate has a thickness smaller than that of the thick glass substrate; and after the mirror coating has been formed on the thin glass substrate, laminating the thin glass substrate to the pre-bent thick glass substrate using at least one polymer inclusive adhesive layer to form a laminate mirror to be used in a concentrating solar power apparatus.

In other example embodiments of this invention, there is provided a concentrating solar power apparatus including at least one mirror, the concentrating solar power apparatus comprising: a bent laminate mirror comprising a thick glass substrate having a thickness of at least 2.0 mm, a thin glass substrate having a thickness of from about 1.0 to 2.25 or 1.0 to 2.0 mm, and a mirror coating formed on the thin glass substrate, the thin glass substrate being laminated to the thick glass substrate with at least one adhesive layer so that the adhesive layer and the mirror coating are both located between the thin and thick glass substrates; and wherein the bent laminate mirror is substantially parabolic in shape and has a solar reflectance of at least 90%.

In certain cases, flat, parabolic, spherical, or otherwise shaped and/or arranged laminated or monolithic mirror panels for use in solar concentrating systems would benefit from additional stiffness. For example, an increase in stiffness would help to meet high wind, dimensional stability, and/or other requirements. This is true not only for hurricane-prone areas, but also areas that experience moderate winds that could be strong enough to cause a mirror to avoid holding a tight focus. In general, laminated or monolithic mirror panels for use in solar concentrating systems will deflect at least some wind but also will vibrate because of such winds. Indeed, vibration and deflection during operation results in some de-focusing of the system, with the system being extremely sensitive to small changes or error in panel shape, e.g., whether that shape is parabolic or otherwise. At a first level of interference caused by wind, the laminated or monolithic mirror panels will not perform at peak efficiency and/or will lose energy, since the mirrors will not be able to accurately focus light in the appropriate area. For example, a mirror having a diameter of about 8 meters may not be able to adequately focus the light on a hole or aperture of only a few inches in diameter. At second level of interference, a mirror will fail completely and may even become damaged in the process.

Simply adding glass thickness will help to increase rigidity. However, adding glass thickness quickly results in large increases in panel mass which, in turn, drives a need for stronger, more expensive support structures. Furthermore, another impeding factor for thicker monolithic glass is the increased transmission path of light to the mirror surface and the resulting drop in reflectivity of the mirror and hence efficiency of the energy collection. Fractions of percentage points of reflectivity are competitive drivers in these panels; thus, adversely affecting reflectance can have a disadvantageous impact on the assembled products. Therefore, simply adding glass thickness may not always be a viable, cost-effective option.

Another option involves bonding a whole separate structure to substantially all of the monolithic or glass mirror. However, this technique also becomes expensive. In addition, it is difficult to bond materials to glass on a substantially permanent basis. Indeed, such structures likely would not meet durability requirements, which typically require survivability throughout a 10-30 year period in a desert climate.

Additionally, the different materials likely will have different coefficients of thermal expansion (CTE). Because the two different materials (e.g., the glass and the material bonded to it for support) will expand and/or contract at different temperatures relative to one another, delamination and/or breakdown of the components will occur. Furthermore, UV penetration oftentimes will hasten such delamination and/or breaking down of the components.

Thus, in addition or in the alternative to the above, it will be appreciated that there is a need in the art for increasing the thickness of mirror panels in solar concentrating systems or the like.

Accordingly, certain example embodiments provide one or more stiffening rib(s) that are preformed to the part shape and are bonded to the back of the glass to increase overall panel stiffness. This arrangement advantageously adds stiffness without unduly increasing weight in certain example embodiments.

In certain example embodiments of this invention, a stiffening rib for a reflector in a solar collector system is provided. At least one area suitable for accommodating a polymer-based adhesive for bonding the rib to a side of the reflector facing away from the sun is provided. The stiffening rib is formed so as to substantially match a contour of the reflector. At least two of the rib, the reflector, and the adhesive have respective coefficients of thermal expansion within about 50% of one another. The stiffening rib is sized and positionable on the reflector so as to increase an EI value of the reflector at least about 10 times or to at least about 9,180 pascal meters$^4$.

In certain example embodiments of this invention, there is provided a solar collector system including a plurality of reflectors, with each said reflector having a stiffening rib associated therewith and attached thereto on a side facing away from the sun. At least one area on each said stiffening rib is suitable for accommodating a polymer-based adhesive for bonding the rib to a side of the associated reflector facing away from the sun. Each said stiffening rib is formed so as to substantially match a contour of the associated reflector. At least two of each said rib, the associated reflector, and the adhesive have respective coefficients of thermal expansion within about 50% of one another. Each said stiffening rib is sized and positioned on the associated reflector so as to increase an EI value thereof at least about 10 times or to at least about 9,180 pascal meters$^4$.

In certain example embodiments of this invention, a method of making a solar collector system including a plurality of reflectors is provided. Each said reflector has a stiffening rib associated therewith. Each said stiffening rib is bonded to the associated reflector via a polymer-based adhesive, with each said stiffening rib being bonded to the associated reflector on a side facing away from the sun. Each said stiffening rib is contoured to substantially match a shape of the associated reflector. At least two of each said rib, the associated reflector, and the adhesive have respective coefficients of thermal expansion within about 50% of one another. Each said stiffening rib is sized and positioned on the associated reflector so as to increase an EI value thereof at least about 10 times or to at least about 9,180 pascal meters$^4$.

In certain example embodiments of this invention, a method of making a stiffening rib for a reflector in a solar collector system is provided. This method comprises roll-forming steel, injection molding plastic or glass-filled plastic, or extruding aluminum so as to form the stiffening rib. The stiffening rib is formed so as to include at least one area suitable for accommodating a polymer-based adhesive for bonding the rib to a side of the reflector facing away from the sun. The stiffening rib is formed so as to substantially match a contour of the reflector. At least two of the rib, the reflector, and the adhesive have respective coefficients of thermal expansion within about 50% of one another. The stiffening rib is sized and positionable on the reflector so as to increase an EI value of the reflector at least about 10 times or to at least about 9,180 pascal meters$^4$.

The features, aspects, advantages, and example embodiments described herein may be combined in any suitable combination or sub-combination to realize yet further embodiments of this invention.

DETAILED DESCRIPTION OF EXAMPLE EMBODIMENTS OF THE INVENTION

Figure 1:
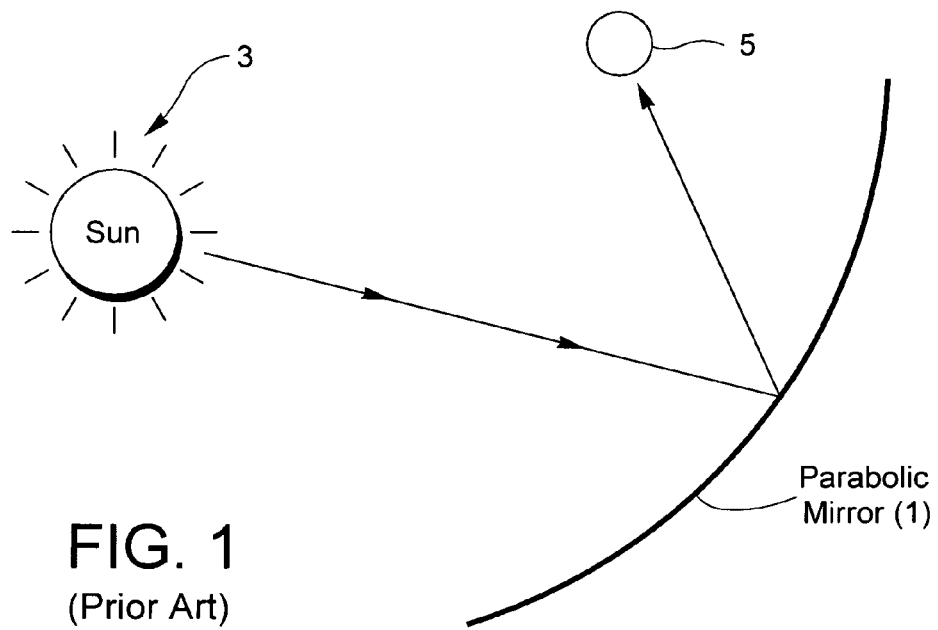
FIG. 1 is a schematic diagram of a conventional solar collector system.

Referring now more particularly to the accompanying drawings in which like reference numerals indicate like parts throughout the several views.

Figure 2:
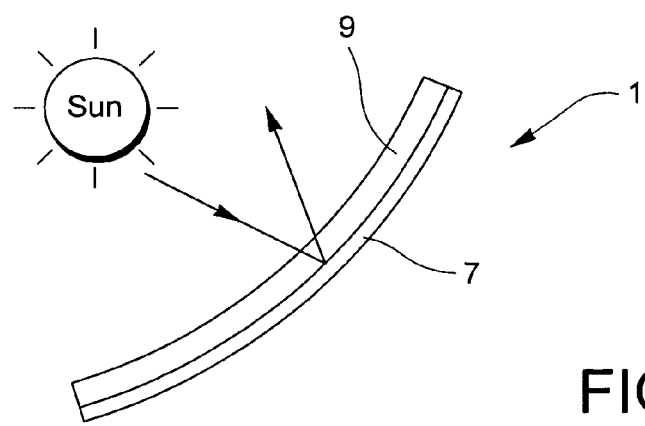
FIG. 2 is a cross sectional view of the second surface mirror used in the conventional solar collector system of FIG. 1.

In certain example embodiments of this invention, a parabolic trough or dish reflector/mirror laminate for use in a concentrating solar power apparatus is made by: (a) forming a reflective coating on a thin substantially flat glass substrate (the thin glass substrate may or may not be pre-bent prior to the coating being applied thereto; if the thin glass substrate is pre-bent prior to application of the coating thereon then its thin nature and large size/weight will permit the glass to sag so as to be flat or substantially flat in the coating apparatus when the coating is applied thereto, such that the coating is still applied to a flat or substantially flat glass substrate even though it may have been pre-bent), (b) optionally, if the thin glass substrate in (a) was not pre-bent, cold-bending the thin glass substrate with the reflective coating thereon; and (c) applying a plate or frame member to the thin bent glass substrate with the coating thereon from (a) and/or (b), the plate or frame member (which may be another thicker pre-bent glass sheet, for example) for maintaining the thin glass substrate having the coating thereon in a bent orientation in a final product. It is noted that (b) and (c) may be performed at essentially the same time or one right after the other, or in entirely different steps, in different example embodiments of this invention. E.g., see FIGS. 11-17. For example, the thin glass substrate with the coating thereon may be cold-bent when it is pressed against the plate or frame member during a laminating process, so that (b) and (c) would be performed right after one another or at essentially the same time. Alternatively, the thin glass substrate with the reflective coating thereon may be cold-bent and after the cold bending the thin glass substrate could be brought to and coupled with the plate or frame member. The reflective coating may be a single layer coating, or a multi-layer coating, in different example embodiments of this invention. FIGS. 1-2 illustrate an example concentrating solar power apparatus to which certain example embodiments of this invention may apply.

In certain example embodiments, the reflector/mirror laminate is a parabolic dish or trough type reflector and reflects incident sunlight (e.g., visible and/or IR radiation) and focuses the same at a common location. For instance, a liquid to be heated may be positioned at the focal point of the parabolic mirror(s) so that the reflected sunlight heats the liquid (e.g., water, oil, or any other suitable liquid) and energy can be collected from the heat or steam generated by the liquid.

In certain example embodiments of this invention, when the thin glass substrate is not pre-bent prior to forming the reflective coating thereon, the thin glass substrate with the reflective coating thereon may in (b) and/or (c) be cold-bent at a temperature of no more than about 200 degrees C., more preferably no more than about 150 degrees C., more preferably no more than about 100 degrees C., even more preferably no more than about 75 degrees C., still more preferably no more than about 50 degrees C., still more preferably no more than about 40 or 30 degrees C. The cold-bent thin glass substrate with the reflective coating thereon may then be laminated to the plate or frame member (which may be another thicker pre-bent glass sheet, for example) for maintaining the coated thin glass substrate in a bent orientation in a final product.

In certain example embodiments, the thin glass substrate or sheet 9' may be substantially clear and have a high visible transmittance of at least about 85%, more preferably of at least about 88%, more preferably of at least about 89%, and possibly of at least about 90%. Moreover, the thin glass substrate/sheet 9' may be soda-lime-silica type glass, and may have a low iron content such as less than about 500 ppm total iron, more preferably less than about 450 ppm total iron, and still more preferably less than about 425 ppm iron. The less the iron, the more visible and/or IR light which can makes its way through the glass thereby permitting improved heating of the liquid or the like to be heated in the concentrating solar power apparatus. These features of the glass sheet 9' may or may not apply to any embodiment herein. In certain example embodiments, the thick glass substrate 14/18 may have a higher total iron content (e.g., greater than 425, 450 or 500 ppm) than the thin glass substrate 9'.

In certain example embodiments of this invention, the plate or frame member may be another glass substrate/sheet that is thicker than the thin glass substrate having the reflective coating thereon, and may optionally have been pre-bent (e.g., via hot bending) prior to being laminated to the thin glass substrate and/or reflective coating. E.g., see FIGS. 13-17. The pre-bent (via hot-bending) thick glass substrate/sheet may be laminated/adhered to the thin glass substrate with the reflective coating thereon via an adhesive/laminating layer which is typically polymer based (e.g., PVB, or any other suitable polymer inclusive adhesive). E.g., see FIGS. 13-17. In certain other example embodiments, the plate or frame member may be flat and may be applied to the thin glass substrate prior to bending thereof. Then, the plate member (e.g., of glass, thermoplastic, or the like) and the thin glass substrate can be bent together with the plate or frame member optionally being pre-heated to permit more efficient bending thereof. E.g., see FIG. 11.

In certain example embodiments of this invention, the reflector may be used as a mirror in a solar collector (e.g., see FIGS. 1-2 and 16), or in any other suitable application. In certain example embodiments of this invention, the reflector is a mirror (first or second surface mirror) which may be used in applications such as one or more of: parabolic-trough power plants, compound parabolic concentrating collectors, solar dish-engine systems, solar thermal power plants, and/or solar collectors, which rely on mirror(s) to reflect and direct solar radiation from the sun. In certain example instances, the mirror(s) may be mounted on a steel or other metal based support system. In certain example embodiments, the reflector may be an IR reflecting coated article that may be used in window or other applications. In such IR reflecting embodiments, the reflective coating may include at least one infrared (IR) reflecting layer of or including a material such as silver, gold, or the like, and may be at least partially transmissive to visible light while blocking/reflecting significant amounts of IR radiation, and may be used in window or other suitable applications. Visible light may also be reflected.

FIGS. 3-8 illustrate an example process of making a reflector according to an example embodiment of this invention. First, a thin flat glass substrate (e.g., soda-lime-silica based float glass) 9' is provided in uncoated form. The flat glass substrate 9' may be clear or green colored, and may be from about 0.5 to 2.5 mm thick, more preferably from about 1.0 to 2.25 mm thick, even more preferably from about 1.0 to 2.0 mm thick, more preferably from about 1.5 to 2.0 mm thick, more preferably from about 1.5 to 1.8 mm thick, and most preferably from about 1.65 to 1.75 mm thick. In this particular embodiment, the thin glass substrate 9' is not pre-bent, but may optionally be heat strengthened, prior to application of a coating thereon. Then, a reflective coating 10 is formed on the flat thin glass substrate 9' via sputtering, sol-gel, spraying, or the like. Examples of the reflective coating 10 are shown in FIGS. 3-5 and 9-15, but not in FIGS. 6-8 for purposes of simplicity. The reflective coating 10 may be made up of a single reflective layer, or alternatively may be made up of a plurality of layers in different instances. In single layer embodiments, the reflective coating 10 may be made up of a single reflective layer of aluminum, silver, chromium, gold or the like that is sufficient to reflect the desired radiation (e.g., visible and/or IR radiation). In multi-layer embodiments, the reflective coating 10 may include a reflective layer of aluminum, silver, chromium, gold or the like and other layer(s) such as silicon oxide, silicon nitride, and/or the like which may be provided over and/or under the reflective layer. Other example reflective coatings 10 are set forth in U.S. Patent Document No. 2003/0179454, 2005/0083576, Ser. No. 10/945,430, Ser. No. 10/959,321, U.S. Pat. No. 6,783,253, U.S. Pat. No. 6,251,482, U.S. Pat. No. 3,798,050, or U.S. Pat. No. 6,934,085, any of which may be used herein, the disclosures of which are hereby incorporated herein by reference. Examples of a multi-layer reflective coating 10 are shown in detail in FIGS. 15-16.

Figure 15:
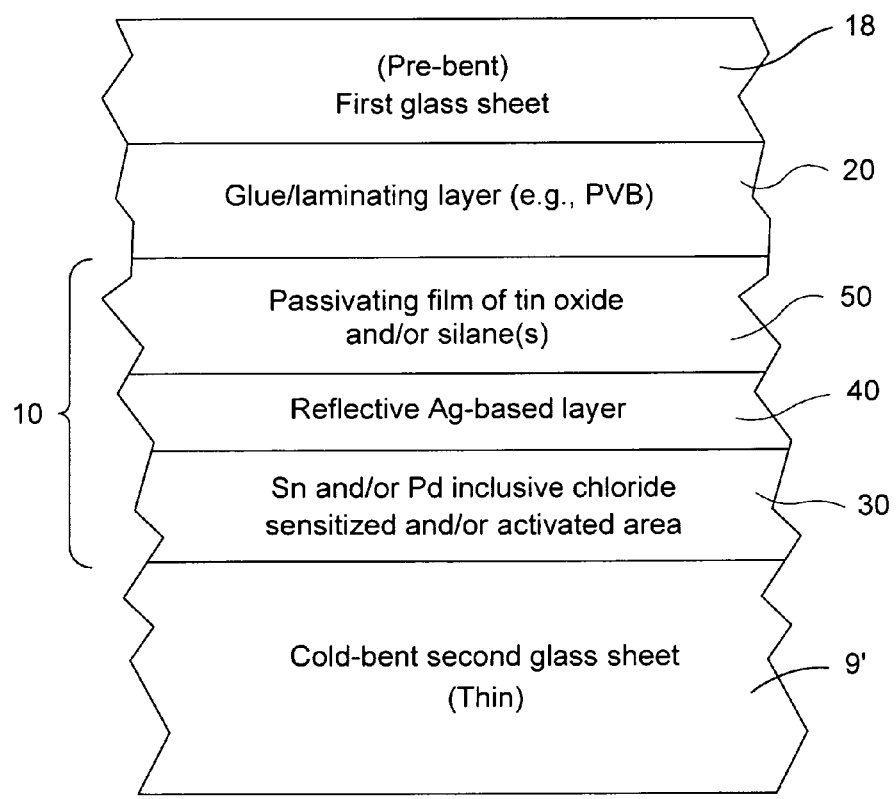
FIG. 15 is a cross sectional view of a mirror made in any of the FIG. 11-14 embodiments.
Figure 16:
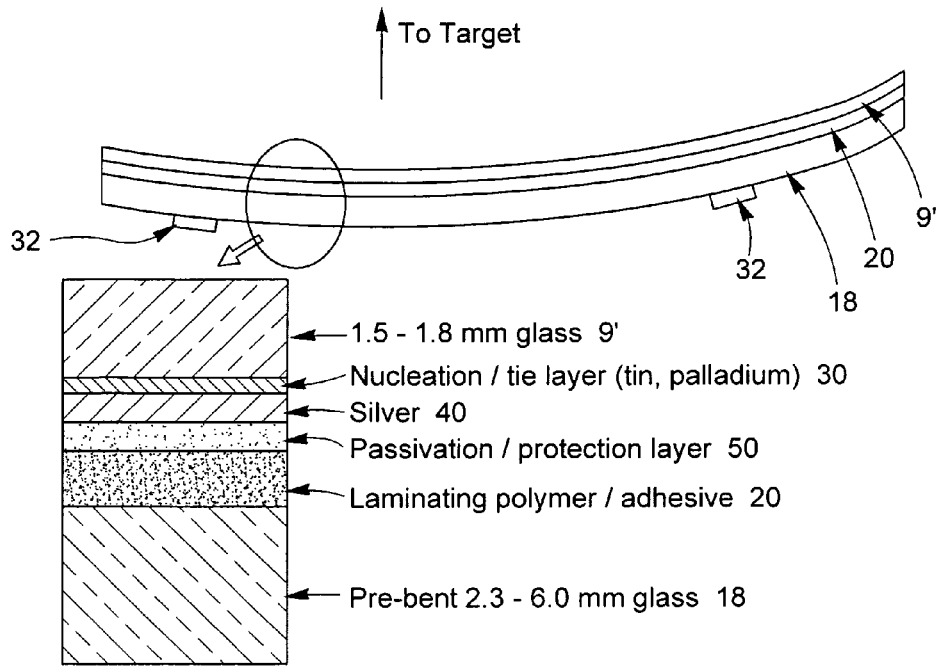
FIG. 16 is a cross-sectional view of a mirror made in accordance with any of the FIG. 11-15 embodiments.

In certain example mirror embodiments, the reflective layer (e.g., Al, Ag, Au or Cr based layer) 40 of the coating 10 may have an index of refraction value "n" of from about 0.05 to 1.5, more preferably from about 0.05 to 1.0. Note that the overall coating 10 is shown in FIGS. 3-5, 9-10, 12, and 14 for purposes of simplicity, but that reflective layer 40 of the coating 10 is shown in FIGS. 15-16 which are provided for more example detail. It should also be noted that the coating 10 may consist of only the reflective layer 40 in certain example instances, but may include other layers in addition to the reflective layer 40 in other example instances such as shown in FIGS. 15-16. When the reflective layer 40 of the coating 10 is of or based on Al, the index of refraction "n" of the layer may be about 0.8, but it also may be as low as about 0.1 when the layer is of or based on Ag. In certain example embodiments of this invention, a reflective metallic layer 40 of Ag may be applied at a silvering station where a silvering solution is sprayed on, the silvering solution including a silver salt and a reducing agent(s). In other example embodiments, a reflective layer 40 of Al may be sputtered onto the glass substrate 9', directly or indirectly, using a C-MAG rotatable cathode Al inclusive target (may or may not be doped) and/or a substantially pure Al target (>=99.5% Al) (e.g., using 2 C-MAG targets, Ar gas flow, 6 kW per C-MAG power, and pressure of 3 mTorr), although other methods of deposition for the layer may be used in different instances. The reflective layer(s) 40 of the coating 10 in certain embodiments of this invention has a reflectance of at least 75% in the 500 nm region as measured on a Perkin Elmer Lambda 900 or equivalent spectrophotometer, more preferably at least 80%, and even more preferably at least 85%, and in some instances at least about 90% or even at least about 95%. Moreover, in certain embodiments of this invention, the reflective layer 40 is not completely opaque, as it may have a small transmission in the visible and/or IR wavelength region of from 0.1 to 5%, more preferably from about 0.5 to 1.5%. The reflective layer 40 may be from about 20-150 nm thick in certain embodiments of this invention, more preferably from about 40-90 nm thick, even more preferably from about 50-80 nm thick, with an example thickness being about 65 nm when Al is used for the reflective layer 40.

Figure 3:
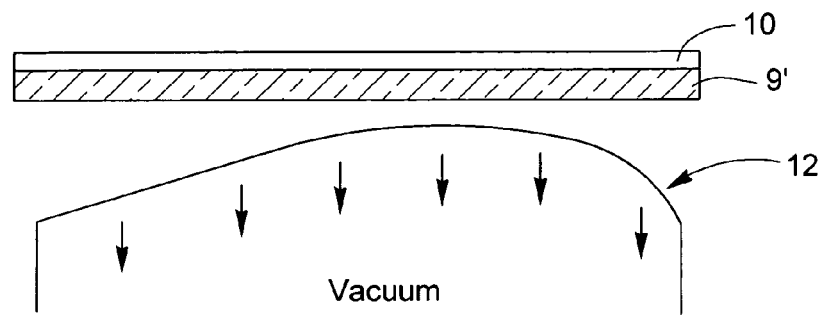
FIG. 3 illustrates a first step performed in making a bent reflecting according to an example embodiment of this invention.

It is advantageous that the reflective coating 10 is formed (e.g., via sputtering or the like) on the glass 9' when the glass is in a flat form, as shown in FIG. 3. This permits the coating to be formed in a more consistent and uniform manner, thereby improving the reflective characteristics thereof so that the final product may achieve improved optical performance (e.g., better and/or more consistent reflection of visible and/or IR radiation).

Figure 4:
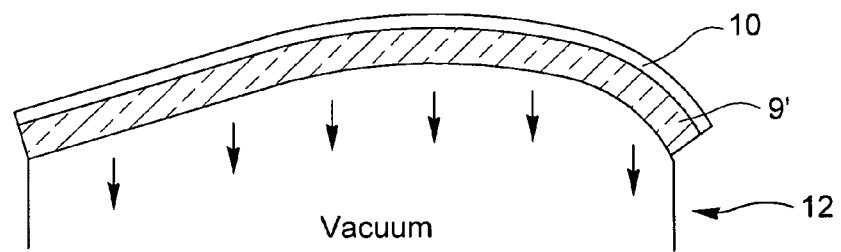
FIG. 4 illustrates another step performed in making a bent reflecting according to an example embodiment of this invention.

Once the reflective coating 10 has been formed on the flat glass substrate 9' to form a coated article as shown in FIG. 3, the flat coated article is positioned over a mold 12. The mold 12 may be in the shape of a parabolic/parabola or the like, to which it is desired to bend the coated article. Moreover, as shown in FIG. 3, the mold 12 may have a plurality of holes defined therein for drawing a vacuum to help bend the coated article. The coated article including the glass 9' and reflective coating 10 is positioned over and lowered onto the surface of the mold 12. The coated article, including the glass 9' and coating 10 thereon, is then cold-bent along the parabolic surface of the mold 12 as shown in FIG. 4. The cold-bending may be achieved via a gravity sag on the parabolic surface of the mold 12, with the optional help of the vacuum system which helps draw the coated article toward the parabolic mold surface 12. In certain example embodiments, the glass 9' may directly contact the parabolic bend surface of the mold 12 during the bending process.

The bending of the coated glass article shown in FIGS. 3-4 is a cold-bend technique, because the glass is not heated to its typical bending temperature(s) of at least about 580 degrees C. Instead, during the bending of FIGS. 3-4, the glass substrate 9' with the coating 10 thereon may be bent while at a temperature of no more than about 200 degrees C., more preferably no more than about 150 degrees C., more preferably no more than about 100 degrees C., even more preferably no more than about 75 degrees C., still more preferably no more than about 50 degrees C., still more preferably no more than about 40 or 30 degrees C., and possibly at about room temperature in certain example instances. In order to not exceed the maximum tensile stress (e.g., 20.7 to 24.15 MPa) that would lead to spontaneous breakage of the glass during cold bending in this configuration, the thickness of glass substrate 9' is kept relatively thin as explained above. For example, in certain example embodiments of this invention, the glass 9' is from about 0.5 to 2.5 mm thick, more preferably from about 1.0 to 2.25 mm thick, and most preferably from about 1.0 to 2.0 mm thick, and even more preferably from about 1.5 to 1.8 or 1.9 mm thick.

Figure 5:
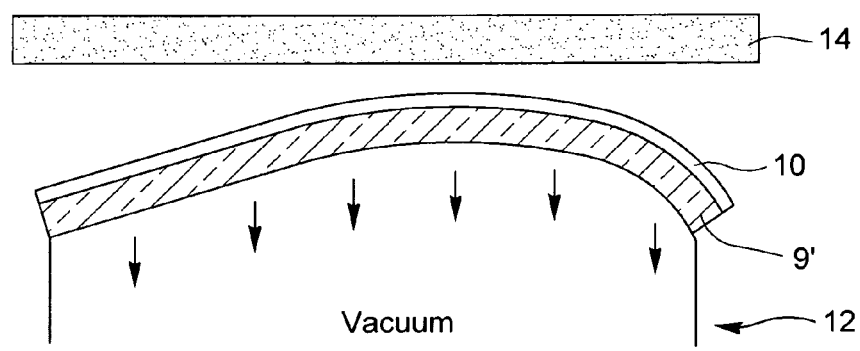
FIG. 5 illustrates another step performed in making a bent reflecting according to an example embodiment of this invention.
Figure 6:
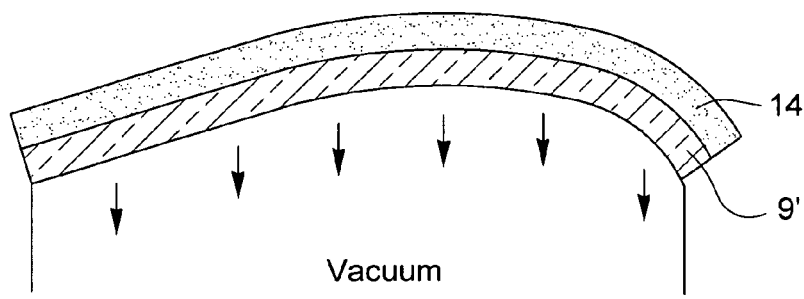
FIG. 6 illustrates another step performed in making a bent reflecting according to an example embodiment of this invention.
Figure 7:
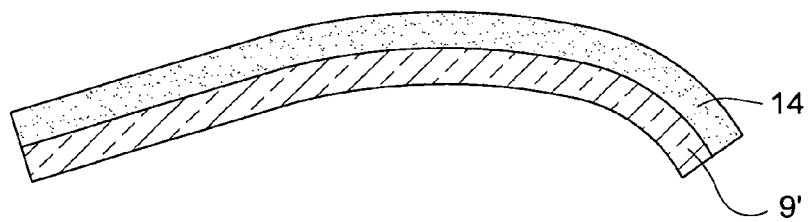
FIG. 7 illustrates yet another step performed in making a bent reflecting according to an example embodiment of this invention.

After the coated article including the glass 9' and coating 10 has been cold-bent to its desired shape (e.g., parabolic shape) as shown in FIG. 4, this bent shape is maintained using a plate/frame 14 such as another glass sheet or a thermoplastic member on which the coated article may be glued or otherwise adhered (see FIG. 5). Optionally, addition of an adequate adhesive agent (not shown), or an adhesive/laminating layer 20 as shown in FIGS. 11-15, may be used to caused excellent adhesion between the coated article and the plate 14. The plate 14 may be transparent or opaque in different embodiments of this invention. The plate 14 may or may not be pre-bent in a shape corresponding to the cold-bent substrate in different example embodiments of this invention. In certain example embodiments, the plate 14 is another glass sheet that is thicker (e.g., from about 2.0 to 10.0 mm thick, more preferably from about 2.0 (or 2.3) to 6.0 mm thick, even more preferably from about 2.1, 2.2 or 2.3 to 5.5 mm thick) than the thin glass sheet 9', and the glass plate 14 may have been pre-bent via hot bending (using temperature of at least about 580 degrees C.) into a shape substantially corresponding to (corresponding to or also including possible over-bending to compensate for a straightening effect of the thin glass 9' upon attachment thereto) the shape of the desired parabola or thin glass 9'. The plate 14 may be attached to the cold-bent glass 9' (and thus to the reflective coating thereon) via an adhesive/laminating layer and/or via fasteners in different example embodiments of this invention, in order to freeze its bent shape around the exterior of the coated article made up of the cold-bent glass 9' and the reflective coating 10. After thin glass sheet 9' has been attached to plate 14, the cold-bent article may then be removed from the mold 12 as shown in FIG. 7. The bent/shaped thick plate 14 then maintains the bent shape of the cold-bent thin glass 9' to which it is adhered and/or fastened, thereby keeping the thin glass 9' and coating 10 thereon in a desired bent shape/form, as shown in FIG. 7.

Note that it is possible to use stiffening material (e.g., glass fibers or the like) in the plate 14 so provide the plate 14 with substantially the same dilatation properties as the glass 9' (e.g., embedded glass fibers in polypropylene). Optionally, the plate 14 may also cover the edges of the glass 9' and coating 10 so as to function as a mechanical protector to protect the edges of the glass and possibly prevent or reduce oxidation or degradation of the glass 9' and/or coating 10.

Figure 8:
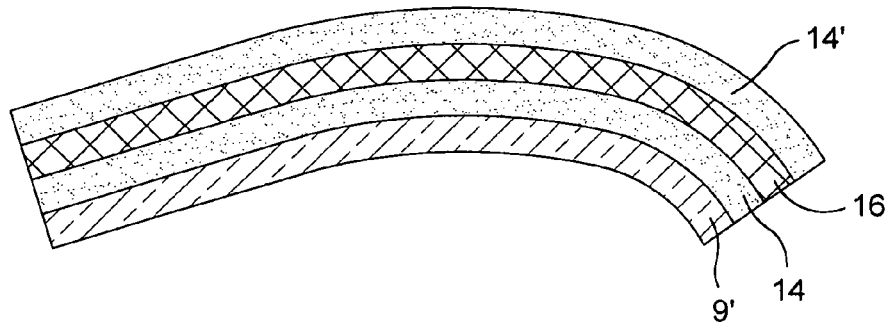
FIG. 8 illustrates another optional step performed in making a bent reflecting according to an example embodiment of this invention.

Optionally, as shown in FIG. 8, spacers (e.g., honeycomb spacers) 16 may optionally be provided and another similarly bent plate 14' on the bent glass substrate 9' over the plate 14 is also possible. The combination of layers 14, 16 and 14' may be applied together at the same time as one unit on the glass 9', or alternatively may be applied sequentially as separate layers in different example embodiments of this invention.

Figure 9:
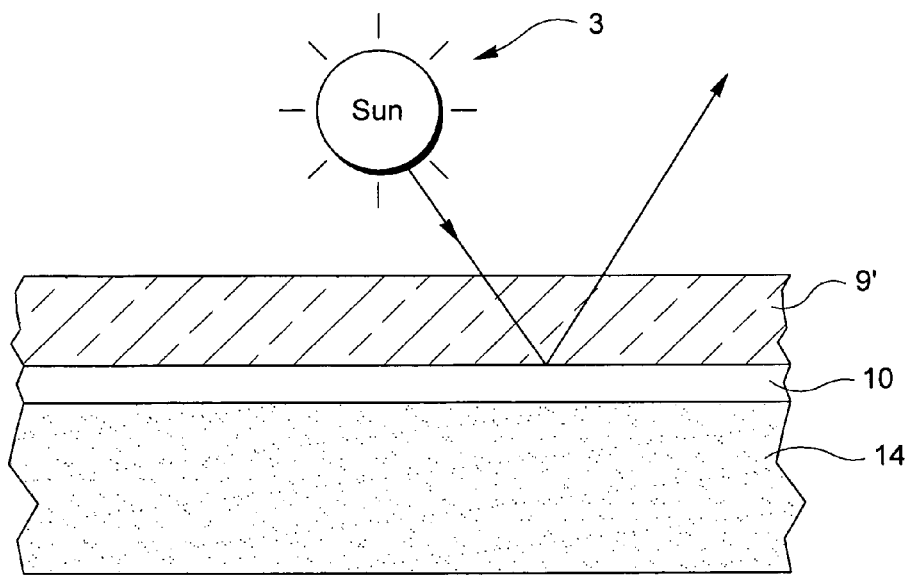
FIG. 9 is a cross sectional view of a reflector according to an embodiment of this invention, where a second surface mirror may be used such that the reflective coating is provided on the side of the glass substrate opposite the light incident side.
Figure 10:
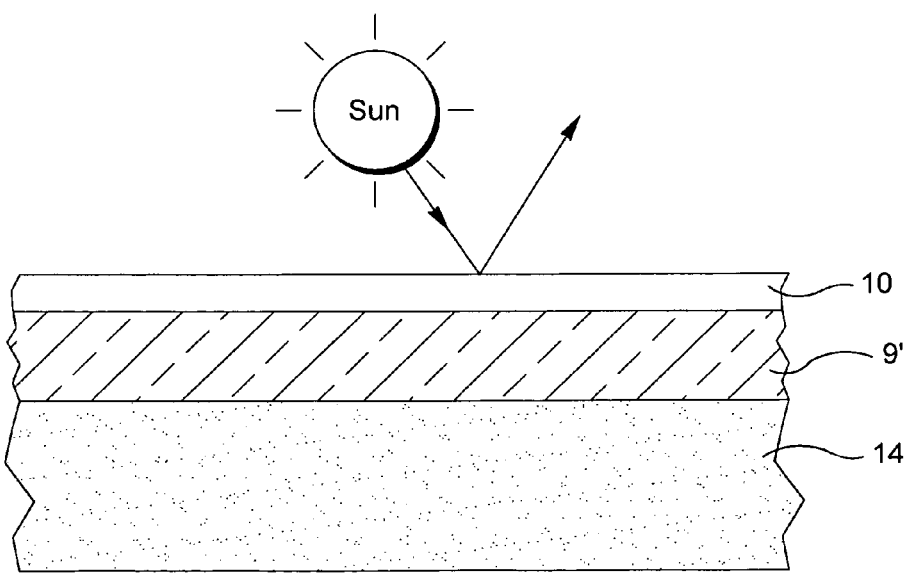
FIG. 10 is a cross sectional view of a reflector according to an embodiment of this invention, where a first surface mirror may be used such that the reflective coating is provided on the light incident side of the glass substrate.

FIGS. 9-10 are cross sectional views of portions of bent mirrors according to different example embodiments of this invention, and illustrate that first surface mirrors (FIG. 10) or back surface mirrors (FIG. 9) may be used in different instances. FIG. 9 illustrates that the mirror is a back or second surface mirror because the incident light from the sun has to first pass through the glass 9' before being reflected by coating 10.

Certain example embodiments of this invention are advantageous for a number of reasons. For example and without limitation, the thin glass 9' used in the bending process is advantageous in that it permits high reflection characteristics to be realized, low weight characteristics and reduces constraints on the reflective coating. In other words, high reflection amounts (e.g., at least 90%, more preferably at least 91%, and possibly at least 92%) may be provided because of the thin nature of glass sheet 9' in any example embodiment herein (e.g., this may possibly apply to any example embodiment herein, such as those shown in FIG. 3-8 or 1-17). Moreover, in certain example embodiments, the cold-bending is advantageous in that it reduces distortions of the glass 9' and/or coating 10 and provides for good shape accuracy, and the application of the coating 10 to the glass 9' when the glass is in a flat form allows for improved mirror and/or reflective qualities to be realized. Moreover, the laminate nature of the product, with the plate 14 being adhered to the glass 9', provides for better safety and allows the reflector to perform even if it should be cracked or broken; and collateral damage may be reduced due to the laminate nature of the reflector (e.g., this may possibly apply to any example embodiment herein, such as those shown in FIG. 3-8 or 11-17).

In certain example embodiments of this invention, plate 14 may be a glass sheet, possibly thicker than glass sheet 9', that is adhered to the cold-bent glass 9' and coating 10 via a glue layer. A glue layer may also be referred to as a laminating layer or an adhesive layer. Examples of such embodiments are shown in FIGS. 11-17.

Figure 11:
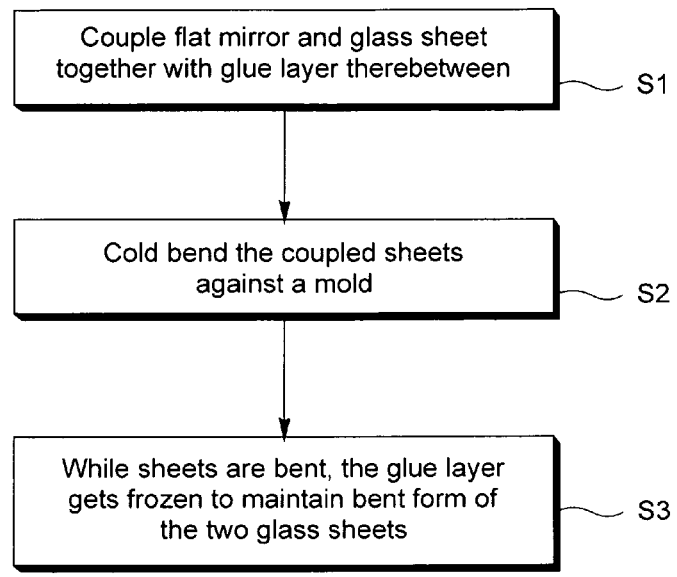
FIG. 11 is a flowchart illustrating steps performed in making a mirror according to another example embodiment of this invention.
Figure 12:
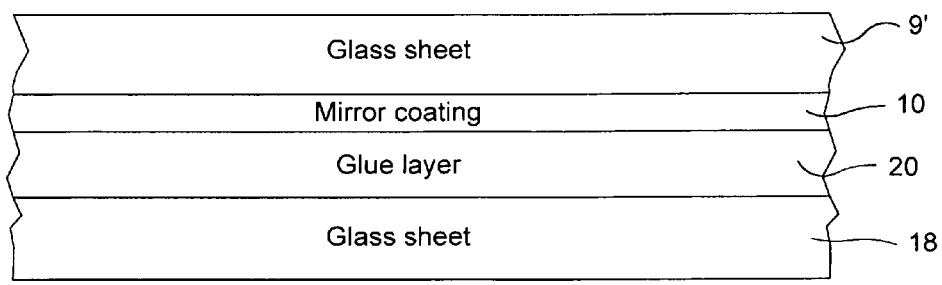
FIG. 12 is a cross sectional view of the mirror made in the FIG. 11-12 embodiment.

Another example embodiment is discussed in the context of at least FIGS. 11-12. Referring to FIGS. 11-12, a flat thin glass substrate (e.g., soda-lime-silica based float glass) 9' is provided in uncoated form. In this FIG. 11-12 embodiment, the thin glass substrate 9' may or may not be pre-bent via hot bending (e.g., using temperature of at least about 580 degrees C.) and/or heat strengthen prior to being coated. The thin glass substrate 9' may be clear or green colored, and may be of a thickness as discussed above. Then, a reflective coating 10 (e.g., any mirror coating discussed herein, or any other suitable mirror coating) is formed on the flat glass substrate 9' via sputtering, sol-gel, spraying, wet chemical application, and/or the like. As mentioned above, the thin glass substrate 9' may or may not be pre-bent prior to the coating 10 being applied thereto; if the thin glass substrate 9' is pre-bent prior to application of the coating 10 thereon then its thin nature and large size/weight may permit the glass 9' to lie flat or substantially flat in the coating apparatus when the coating is applied thereto, such that the coating 10 is still applied to a flat or substantially flat glass substrate 9' even though it may have been pre-bent. As discussed above, the reflective coating 10 may be made up of a plurality of layers, or of a single reflective layer 40. In multi-layer embodiments, the reflective coating 10 may include a reflective layer 40 of silver, aluminum, chromium, gold or the like and other layer(s) which may be provided over and/or under the reflective layer. Other example reflective coatings 10 are set forth in U.S. Patent Document Nos. 2003/0179454, 2005/0083576, Ser. No. 10/945,430, Ser. No. 10/959,321, U.S. Pat. No. 6,783,253, U.S. Pat. No. 6,251,482, U.S. Pat. No. 3,798,050, or U.S. Pat. No. 6,934,085, any of which may be used herein, the disclosures of which are hereby incorporated herein by reference. It is advantageous that the reflective coating 10 is formed (e.g., via sputtering, spraying, wet chemical application, sol-gel, and/or the like) on the glass 9' when the glass is in a flat or substantially flat form, regardless of whether or not it has been pre-bent; as this permits the coating 10 to be formed in a more consistent and uniform manner thereby improving the reflective characteristics thereof so that the final product may achieve improved optical performance (e.g., better and/or more consistent reflection of visible and/or IR radiation).

Then, in the FIG. 11-12 embodiment, the coated article including thin glass substrate 9' with reflective coating 10 thereon is coupled to another glass substrate 18, possibly called a plate in certain instances (which may be flat or pre-bent), with a glue layer 20 provided therebetween (see step S1 in FIG. 11). The glue layer 20 may be made up of a polymer based material in certain example instances. In certain example embodiments, the glue/adhesive/laminating layer 20 may be made of or include polyvinyl butyral (PVB), EVA, or any other suitable polymer based glue material. The glue layer may be initially provided between the glass substrates 9' and 18 in solid and/or non-adhesive form. Then, the multi-layer structure shown in FIG. 12 including glass substrates 9' and 18, with reflective coating 10 and glue layer 20 therebetween, is cold bent on a mold 12 as described above (e.g., see S2 in FIG. 11, and FIGS. 3-4). The curved mold 12 may be made of steel or any other suitable material. Because the glue layer may not be in final adhesive form at this point, the glass substrates 9' and 18 together with the coating 10, glue layer 20 and mold can be maintained in the bent sandwich form by mechanical clamps around the edges of the sandwich, or by any other suitable means. While the multi-layer structure is in its desired cold-bent form on the mold (e.g., with the clamps holding the sandwich in cold-bent form on the mold 10), the glue layer (e.g., PVB) 20 is heated and frozen in an adhesive position in order to maintain the glass substrates 9' and 18 of the laminate in their desired bent form, e.g., in the form of a parabola or the like (see S3 in FIG. 11). The mold may then be removed. In order to "freeze" the glue layer 20, for example and without limitation, the glass substrates 9' and 18 together with the coating 10, glue layer 20 and mold (e.g., possibly with the clamps) in the bent sandwich form can be positioned in a heating oven (e.g., autoclave) (not shown) and heating caused in the oven can cause the glue layer (e.g., PVB) 20 to turn into an adhesive which adheres the two substrates 9' and 18 to each other (i.e., "freeze" the glue layer). After heating and curing of the glue layer 20, the mold may be removed. The now final adhesive glue layer 20, as heated and cured, can function to maintain the cold-bent glass substrates/sheets 9' and 18 in their desired bent form along with coating 10. It is noted that in the FIG. 11-12 embodiment, the reflective coating 10 may be on either major surface of the glass substrate 9'. Thus, the coating 10 may or may not directly contact the glue layer 20.

In certain example embodiments of this invention, the plate 14 may be a pre-bent glass sheet (e.g., which may be hot-bent). Examples of such embodiments where the plate 14 is a pre-bent glass sheet are explained with respect to FIGS. 13-17.

Figure 13:
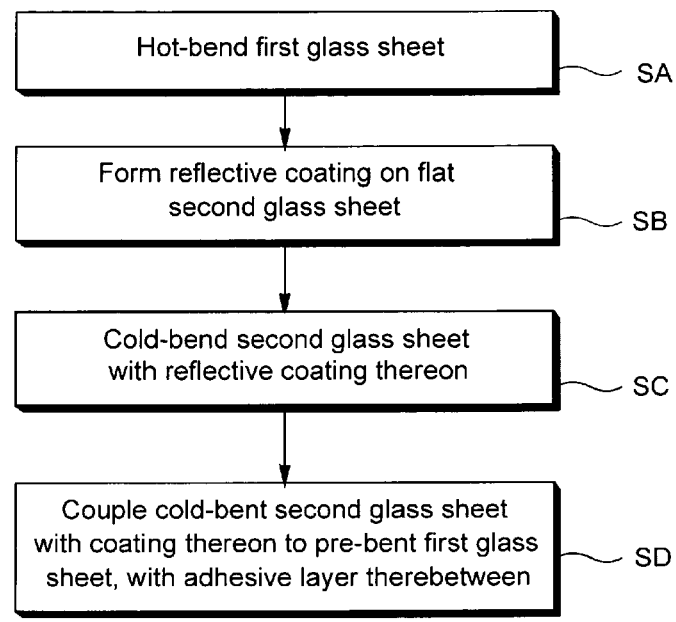
FIG. 13 is a flowchart illustrating steps performed in making a mirror according to yet another example embodiment of this invention.
Figure 14:
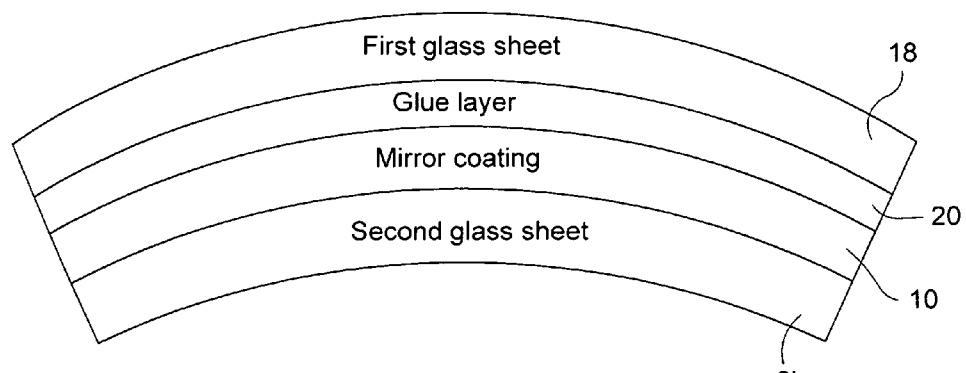
FIG. 14 is a cross sectional view of the mirror made in the FIG. 13-14 embodiment.

Referring to the FIG. 13-14 embodiment, a pre-bent relatively thick first sheet of glass (14 or 18) is provided in step SA. This pre-bent first sheet/substrate of glass 14/18 may be bent by heat-bending as is known in the art, e.g., using bending temperature(s) of at least about 550 degrees C., more preferably of at least about 580 degrees C., and heat strengthening of the glass may take place at the same time as the heat bending. The first relatively thick glass sheet 14/18 may be heat bent in any suitable manner, such as sag bending and/or using a bending mold. Additionally, a flat relatively thin second glass substrate (e.g., soda-lime-silica based float glass) 9' is provided in uncoated form. Like the first glass sheet/substrate 14/18, the flat second glass substrate 9' may be clear or green colored, although the glass substrate 9' is preferably clear and of a low iron and high transmission type as discussed herein. As explained herein, the thick glass sheet 14/18 may have a thickness of from about 2.0 or 2.3 to 10.0 mm thick, more preferably from about 2.0 (or 2.1, 2.2 or 2.3) to 6.0 mm thick, even more preferably from about 3.0 to 5.5 mm thick; whereas the thin glass sheet 9' may have a thickness of from about 0.5 to 2.5 mm thick, more preferably from about 1.0 to 2.25 mm thick, and most preferably from about 1.0 to 2.0 mm thick, or even more preferably from about 1.5 to 1.8 or 1.9 mm. In certain example embodiments of this invention, the thin glass substrate or sheet 9' may have a thickness of at least 0.2 mm (more preferably at least 0.3 mm, even more preferably at least 0.5 mm, possibly at least 1 mm, and sometimes possibly at least 1.5 or 2.0 mm) less than the thickness of the thicker glass sheet or plate 14/18.

Still referring to the FIG. 13-14 embodiment (as well as other example embodiments therein), a reflective coating 10 is formed on the flat second glass substrate 9' via sputtering, spraying, sol-gel, and/or the like, in step SB. Note that the order of steps SA and SB shown in FIG. 13 may be reversed, so that step SB is performed before or at the same time as step SA in certain example instances. Once the reflective coating 10 has been formed on the flat second glass substrate 9' (which may or may not have been pre-bent) to form a coated article as shown in FIG. 3 for instance, the flat coated article may be positioned over a mold 12. The mold 12 may be in the shape of a parabolic or the like, to which it is desired to bend the coated article. Note that the phrases "substantially parabolic" and "substantial parabola" as used herein cover both perfect parabolas and shapes that are close to but not quite perfectly parabolic. Moreover, as shown in FIG. 3, the mold 12 may have a plurality of holes defined therein for drawing a vacuum to help bend the coated article. The coated article including the glass 9' and reflective coating 10 thereon is positioned over and lowered onto the surface of the mold 12. The coated article, including the glass 9' and coating 10 thereon, is then cold-bent along the parabolic surface of the mold 12 as shown in FIG. 4, in step SC of FIG. 13. The cold-bending in step SC may be achieved via a gravity sag on the parabolic surface of the mold 12, with the optional help of the vacuum system which helps draw the coated article toward the parabolic mold surface 12. In certain example embodiments, the glass 9' may directly contact the parabolic bend surface of the mold 12 during the bending process. The bending of the coated glass article shown in FIGS. 3-4 and in step SC of FIG. 13 is a cold-bend technique, because the glass is not heated to its typical bending temperature(s) of at least about 550 or 580 degrees C. Instead, during cold-bending the glass substrate 9' with the coating 10 thereon may be bent while at a temperature of no more than about 250 or 200 degrees C., more preferably no more than about 150 degrees C., more preferably no more than about 100 degrees C., even more preferably no more than about 75 degrees C., still more preferably no more than about 50 degrees C., still more preferably no more than about 40 or 30 degrees C., and possibly at about room temperature in certain example instances.

Note that it is possible to omit step SC in certain example instances so that no mold is used in cold bending of the coated thin glass sheet, and instead the thin glass sheet may be cold bent when it is brought together with the pre-bent thicker glass substrate 14/18 in the lamination process. In order to not exceed the maximum tensile stress (e.g., 20.7 to 24.15 MPa) that would lead to spontaneous breakage of the glass during cold bending in this configuration, the thickness of second glass substrate 9' may be kept relatively thin as discussed above.

After the coated article including the second glass substrate/sheet 9' and coating 10 has been cold-bent to its desired shape (e.g., parabolic shape) in step of FIG. 13 and as shown in FIG. 4 (or optionally during the beginning of a lamination process when the thin glass sheet 9' is brought together with the pre-bent thick glass sheet 14/18), this bent shape of 9' is maintained using the pre-hot-bent first glass substrate/sheet 14/18 that was formed in step SA. In certain example embodiments, the pre-hot-bent first glass sheet 14/18 is laminated or otherwise coupled to the cold-bent second glass sheet 9' with an adhesive/glue layer 20 therebetween as shown in FIGS. 13-15 and as noted in step SD of FIG. 13. The pre-bent glass sheet 18 together with the glue layer 20 then maintain the bent shape of the glass 9' to which it is adhered and/or fastened, thereby keeping the glass 9' and reflective coating 10 thereon in a desired bent shape/form, as shown in FIG. 14. In certain example embodiments of this invention, the glue layer 20 may be made of any suitable adhesive material including but not limited to polyvinyl butyral (PVB), or EVA. It is noted that in the FIG. 13-14 embodiment, the reflective coating 10 may be on either major surface of the glass substrate 9'. Thus, the coating 10 may or may not directly contact the glue layer 20.

However, with respect to the FIG. 13-14 embodiment, note that a second or back surface mirror is preferably used as shown in FIG. 15. In other words, the reflective coating 10 is preferably formed on the interior surface of glass sheet 9' so as to directly contact the laminating/glue layer 20. In such embodiments, light is typically incident on the second glass sheet 9', passes through glass sheet 9' and is reflected by reflective coating 10 in a mirror-like manner back through sheet 9' and toward the desired location for solar collector applications and the like.

An example of making a parabolic trough or dish reflector for use in a concentrating solar power apparatus will now be described with respect to the embodiment of FIGS. 15-17.

A thin glass substrate 9' and a thick glass substrate 14/18 are provided. As explained herein, the thick glass sheet 18 may have a thickness of from about 2.0 to 10.0 mm thick, more preferably from about 2.0 (or 2.3) to 6.0 mm thick, even more preferably from about 2.1, 2.2 or 2.3 to 5.5 mm thick; whereas the thin glass sheet 9' may be of a low-iron type soda lime silica type glass and may have a thickness of from about 0.5 to 2.5 mm thick, more preferably from about 1.0 to 2.25 mm thick, and most preferably from about 1.0 to 2.0 mm thick, and sometimes from about 1.5 to 1.7, 1.8 or 1.9 mm. Moreover, the thin glass substrate or sheet 9' may have a thickness of at least 0.2, 0.3 or 0.5 mm (possibly at least 1 mm) less than the thickness of the thicker glass sheet or plate 18. Also, the thin glass substrate 9' may of the low-iron type and high transmission type in certain example embodiments of this invention.

Before the reflective coating 10 is applied thereto, the thin glass substrate 9' may or may not be pre-bent to a desired degree of curvature (e.g., to the desired parabolic shape) using hot bending (e.g., temperature at least 580 degrees C.); when the glass substrate 9' is pre-bent it has been found that its large size/weight cause it to lie flat or essentially flat in the coating apparatus so that the coating 10 is formed thereon when the glass 9' is in a flat or substantially flat state regardless of whether or not it has been pre-bent. The glass 9' may optionally be heat strengthened prior to the application of coating 10 thereon, with this heat strengthening possibly taking place during the optional pre-bending. Meanwhile, the thick glass substrate 18 is pre-bent via hot bending to the desired parabolic shape, or possibly even overbent (bent to an extent greater than the desired shape for the final product) so as to compensate for straightening effect of the thin glass 9' when coupled thereto. The degree of overbending of glass 18 may be a function of the thickness of the glass 18, and the desired final parabolic shape of the reflector.

The reflective coating 10 is then applied to the thin substantially flat glass substrate 9' in its flat or substantially flat state (regardless of whether it has been pre-bent). For purposes of example only, the mirror coating of the FIGS. 15-16 may be made as follows in certain example embodiments of this invention. Glass sheet 9' is provided, and may or may not have been pre-bent via hot bending. If pre-bent, then the weight and/or size of the glass 9' typically causes it to lie flat or substantially flat in the coating apparatus where the coating 10 is applied. The air side of the glass 9' may be cleaned using an aqueous cerium oxide slurry or the like, and/or polishing brush(es). This cleaning step may help tin and/or palladium sensitizer 30 (sometimes called a nucleation layer) to adhere better to the glass. The glass sheet 9' may then be sensitized by way of a tin chloride solution; e.g., tin sensitizer is applied to the glass via spraying of an aqueous solution of acetic tin chloride. The tin sensitizer may be used for electrodeless deposition of a reflective silver film 40 on the glass 9'. Rising is optional at this point. It is noted that the tin chloride solution, which may possible be a stannous chloride solution in certain instances, may provide for a tin monolayer on the surface of the glass substrate/sheet 9'. Optionally, then, an activating solution including ions of at least one of bismuth (III), chromium (II), gold (III), indium (III), nickel (II), palladium (II), platinum (II), rhodium (III), ruthenium (III), titanium (III), vanadium (III) and zinc (II) is then used to active the substrate prior to silvering. For example, an aqueous solution of or including $PdCl_2$ may be sprayed onto the sheet for activation purposes, for better anchoring of the silver. Thus, for example, a tin (Sn) and/or palladium (Pd) inclusive chloride sensitized and/or activated area 30 may be provided on the surface of the glass 9' as shown in FIG. 15, 16. The activated glass may then proceed to a rinsing station where demineralized water for example may be sprayed, and then to a silvering station where silvering solution is sprayed onto the sheet to form reflective silver layer 40. The silvering solution, in certain example embodiments, may be of or include a silver salt and a reducing agent(s). In certain example instances, silver deposition may include simultaneous spraying of an ammoniacal silver nitrate solution and an aldehyde containing reducing solution; mixing these two solutions results in silver film 40 on substrate 9'. The silver based reflective layer 40 may be from about 40-100 nm thick in certain example instances, with an example being about 70 nm. A copper passivation film 50 may then be formed. Copper deposition on the silver film may provide a passivating protective layer 50 for reducing degradation of the silver in certain instances. The copper film 50 may be formed by the simultaneous spraying of a copper sulfate solution and either suspended iron or zinc particles in certain example instances, where the iron/zinc may serve as reducing agent(s) so that the copper 50 can electrolessly deposit on the silver reflective layer 40. In certain example instances, it has been found that the paint layer(s) normally applied over the copper may not be needed in certain example embodiments of this invention, so that the passivation film 50 is in direct contact with the adhesive layer 20 as shown in FIGS. 15-16 for instance. The adhesive (e.g., PVB) 20 and the thick glass 14/18 provide a high level of protection for the reflective layer 40.

Alternatively, instead of using copper, the passivating film 50 may instead be of or include tin oxide and/or silane(s). In this respect, after the silver has been formed, the glass may then be rinsed and then an acidified solution of tin chloride may be sprayed onto the silvered glass. This tin solution may ultimately form tin oxide on the surface of the coating. Then, the mirror may be treated by spraying it with a solution containing at least one silane. For example, the mirror may be treated by spraying it with a solution including γ-aminopropyl triethoxysilane. Any other silane(s) may instead or also be formed on the surface of the coating. Moreover, it is noted that tin oxide and silane(s) may simultaneously be formed over the silver based layer in certain example embodiments of this invention, or alternatively the silane may be formed prior to the tin oxide. In any event, a passivating film 50 including at least one layer and including one or both of tin oxide and at least one silane may be provided as part of the coating 10 over the silver based reflective layer 40. This passivating film 50, including the tin oxide and/or silane, can directly contact the polymer-based glue layer 20 during the laminating phase.

Of course, it will be appreciated that other materials and/or layers may be used in the reflective coating 10 described above. The aforesaid coating 10 is not intended to be limiting unless expressly claimed. Moreover, other suitable reflective coatings may also suffice in alternative embodiments of this invention.

After the coating 10 has been formed on the thin glass substrate 9', the mirrored piece (thin glass substrate 9' with coating 10 thereon), which may or may not have been pre-bent via a hot bend process, is laminated to the thick pre-bent glass sheet 18 which has been pre-bent via a hot-bend process to a compensated shape which will arrive at the correct desired parabolic shape after assembly. The lamination material 20 for laminating the two articles may be of PVB or the like. The PVB sheet 20 may be formulated to have a high level of adhesion to both glass 18 and passivation film 50 to ensure long term resistance to the stresses of assembly. In certain example instances, the PVB layer 20 may range in nominal thickness from about 0.38 mm to 0.76 mm. The PVB may also be formulated to have a high initial tack at low temperatures to initially hold the assembly together for processing. Note that if the thin glass sheet 9' was not pre-bent, then it can be cold-bent when it is initially applied on and pressed into the concavity of the pre-bent thick glass 18 during the beginning phase of, or just prior to, the laminating process. Optionally, an additional adhesive (not shown) may be applied to either the surface of passivating film 50 or substrate 18, so as to be adjacent the PVB 20; this optional adhesive may be one or more of urethane, acrylic, and/or epoxy based or any other suitable adhesive for external use. It is noted that the transmission and color of the thick glass sheet 18 are not particularly important, because the reflective light does not pass therethrough; thus, the glass sheet 9' may be more clear and more transmissive than the glass sheet 18 in certain example embodiments of this invention.

Edge corrosion may be a problem in certain instances, and can occur when moisture and air are able to attack exposed silver 40 and/or copper 50 to initiate undesirable delamination of the structure. Such delamination leads to more corrosion, loss of integrity, and/or reduced reflectance of the mirror reflector. Protection of the reflector against such attacks may be achieved by one or more of the following: (i) painting or otherwise coating one or more edges of the finished laminate with a protective film of urethane and/or non-acid based silicone, (ii) causing the adhesive layer 20 to overlap the exposed edges of the mirrored substrate, (iii) removal of layer(s) 40 and/or 50 from around all or part of the peripheral edge of the reflector to a distance of up to about 5 mm into the central area of the reflector (edge deletion). In certain instances with respect to (iii), the coating 10 may be masked or removed from only the edge grind portion or less than 2 mm inboard to prevent or reduce loss of reflective area; in certain instances the deletion need only be large enough to allow the laminate to seal directly to glass in order to block corrosion path in certain example embodiments of this invention.

Figure 17:
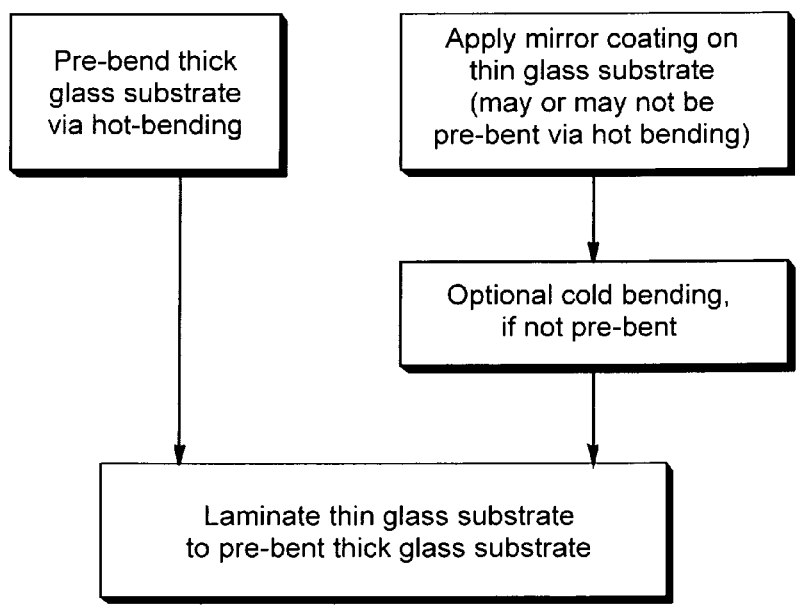
FIG. 17 is a flowchart illustrating steps performed in making a mirror according to a version of the FIG. 13-16 embodiment(s) of this invention.

Samples made in accordance with the above FIG. 15-17 embodiment had a solar reflectance (ISO 9050, AM 1.5) of at least 92%, even at least 92.5%, and with respect to corrosion resistance (CASS ASTM B368) realized 120 hours without degradation. Parabolic trough reflectors (e.g., see FIGS. 7-17) according to certain example embodiments of this invention have a solar reflectance (ISO 9050, AM 1.5) of at least 90%, more preferably of at least 92%, even more preferably of at least 92.5% or 92.6%, and have corrosion resistance (CASS ASTM B368) of being able to withstand at least 120 hours without degradation.

Mounting pads or brackets 32, as shown in FIG. 16, may be used to mount the reflector panel to a holding structure of the solar collector. These pads or brackets 32 may be of any suitable type in different example embodiments of this invention. For example, the pads 32 may be ceramic in certain example instances.

Figure 18A:
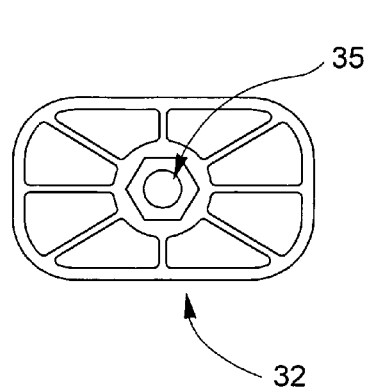
FIGS. 18(a) and 18(b) are top and perspective views, respectively, of an example mounting pad to be used to mount the reflector/mirror panel to a holding structure of the solar collector.
Figure 18B:
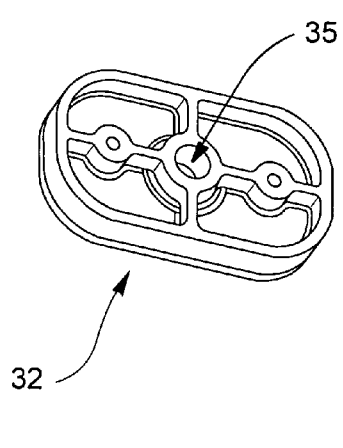

However, in one particular example embodiment of this invention, each solar mirror (e.g., see FIGS. 14-16 and 18-19) may have four, or any other suitable number of, mounting pads 32 adhesively bonded to the non-reflective, back surface of the laminated mirror so that the mounting pads are adhered to the surface of the thick glass substrate 18 furthest from the laminating layer 20. While mounting pads 32 are shown in FIG. 16, FIGS. 18(a) and 18(b) provide more detailed views of pads 32. These mounting pads 32 may be made using an injection molding process, or any other suitable process. These mounting pads 32 may be produced with a 20-40% (e.g., 30%) long glass fiber, such as TPU (thermal plastic urethane) in certain example non-limiting instances (e.g., TPU may be obtained from A Schullman, as a material PBX-15/15 for example). Alternative plastic materials may be substituted for the TPU, and these may include glass filled nylons, or the like. Glass filled plastic materials may be used and may be advantageous in that this will cause the mounting pads 32 to realize a similar co-efficient of thermal expansion rate compared to the glass surface of glass 18 being bonded to. Using such glass filled mounting pads 32 may also be advantageous in that it permits very low stresses upon the adhesive joint which is good for durability purposes in the environments where these products are often used.

Figure 19A:
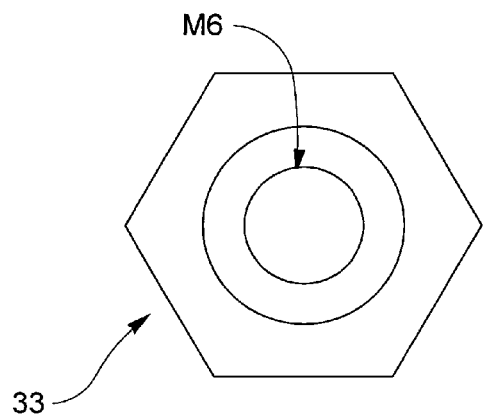
FIGS. 19(*a*) and 19(*b*) are top and side plan views of an example insert to be used in connection with the pad of FIGS. 18(*a*)-(*b*).
Figure 19B:
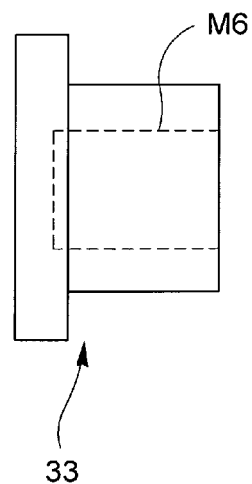

In certain example embodiments, one or more of the mounting pads 32 may be designed to allow for the use of a separately made metallic or substantially metallic insert 33 (see FIGS. 18-19). These inserts 33 may be blind hole threaded with an M6 thread, or any other suitable thread or the like. These metal inserts 33 may be placed into the plastic mounting pad 32 (see the hole 35 in pad 32 shown in FIGS. 18(a)-(b), for receiving the insert 33) just prior to the bonding process, and can allow the finished mirror assembly to be directly bolted to a mounting frame in the concentrating solar power apparatus. In certain example instances, these inserts 33 may be made of a steel suitable for threaded application, or could be of stainless steel or hardened brass in other example instances. In certain example embodiments, the head of the metal insert(s) 33 may be hexagonal in shape as shown in FIGS. 18-19 (although other shapes may instead be used) and this hexagonal head fits down into a mating hexagonal relief area in the mounting pad 32 as shown in FIG. 18(a). This hexagonal insert feature is for preventing or reducing the likelihood of the insert 33 rotating when the finished mirror/reflector laminate is installed in the field. Other anti-rotational features could instead or also be used, including details like oblong insert heads with mating relief areas in the mounting pads.

Prior to bonding the mounting pad(s) 32 to the thick glass substrate 18, the glass surface being bonded may have an adhesion promoter applied to the glass 18. An example adhesion promoter is Dow's Uniprime 16100. After applying this primer to the surface of glass 18, the primed area may be allowed to dry for 20 seconds or any other suitable time before the application of adhesive material. Additionally, the open time of the primed glass expires after 110 hours, or other suitable time depending upon which material(s) is/are used. If this time is exceeded, the glass surface can be re-primed and the bonding process can take place. The surface of the plastic mounting pad 32 that mates with the adhesive may also be primed with Dow's Uniprime 16100 or the like. This priming may be done to eliminate or reduce contaminates. Alternative glass/TPU primers may be used for this application, and include materials such as Dow's 435-18 glass primer and Dow's 435-20A Betaprime.

An example adhesive used to bond the pads 32 to the glass 18 is Dow's 16050 adhesive, although other adhesives may be used. This adhesive works well in combination with the Dow 16100 uniprime primer, and this adhesive is formulated to have additional UV light stability properties which is advantageous in solar concentrator applications. This specific example adhesive is a one-part, moisture cured, urethane adhesive. Additional example benefits of this specific adhesive is its ability to bond to a wide number of different substrates with, and without, the need of additional primers to those substrates. Alternative adhesives may of course be used for this application, and include other moisture cured urethanes, moisture cured silicones, 2-part urethanes such as Dow's Betamate systems or 2-part silicone adhesives.

As noted above, it would be beneficial to increase the thickness of mirror panels in solar concentrating systems or the like. This holds true for flat, parabolic, spherical, or otherwise shaped and/or arranged laminated or monolithic mirror panels for use in solar concentrating systems or the like.

To this end, it is possible to envision alternative mounting components that could be used to accomplish the mounting of the finished mirror in the final application, including bonding of supporting rails (not shown) to the back surface of the mirrors rather than isolated mounting pads 32. This alternative may lead to a stronger mirror assembly more resistant to potential wind/handling damage. Another potential alternative is to have a threaded stud feature on the back surface rather than a blind hole insert. This feature may allow for easier mirror alignment in the frame during installation.

For example, certain example embodiments provide one or more stiffening rib(s) that are preformed to the part shape and are bonded to the back of the glass to increase overall panel stiffness. This arrangement advantageously adds stiffness without unduly increasing weight in certain example embodiments and without adversely affecting the transmission path of light to the mirror surface. As a general principle, stiffening may be achieved by increasing the value of Young's Modulus E of a material, and/or increasing its moment of inertia I. Hence, stiffness is often thought of as the product of these two values, or EI.

Rather than simply increasing the layer thickness of the reflector panels (which may be monolithic or laminated, and which may be parabolic, flat, spherical, or otherwise shaped) which would increase cost, potentially increase mass to or above a level where support structures would have to be modified to contain higher masses, and also potentially affect the light transmission path to the mirror, an alternative approach involved in certain example embodiments involves attaching, via bonding, a stiffening rib or a series of stiffening ribs to the reflector panels. In certain example embodiments, the rib may be made of an appropriate cross section of roll-formed steel, an injection molded plastic or glass-filled plastic, or from extruded aluminum.

Thus, it will be appreciated that a wide variety of different or composite materials may be used as the material forming the rib(s). Steel ribs may be roll formed or stamped from, for example, 1008 or 1010 steel. Steel ribbing may be e-coated to reduce and sometimes even eliminate the need to prime the steel with any additional chemical primers, e.g., as described in greater detail below. Aluminum ribs also could be roll formed, stamped, or possibly even extruded. The aluminum also may be e-coated, e.g., as described in greater detail below, so as to reduce and sometimes even eliminate the need to prime the aluminum with any additional chemical primers.

Plastic rails may be injection molded or possibly extruded. Preferable plastic substrates also may contain a sizeable amount of glass fiber to ensure that the plastic substrate and the glass substrates being bonded have co-efficient of thermal expansion rates that are fairly close to one another, as described in greater detail below. The glass content amount in the plastic substrate may be about 10-50%, more preferably about 20-40%, and still more preferably about 30%, although varying amounts of glass fiber may be found to be acceptable. Possible plastic materials include, for example, TPU (Thermal Plastic Urethane) and PBT (Polybutylene Terephtalate) materials. TPU materials include, for example, Celstran PUG 30 from Ticonam and PBT materials include Rynite 30 from Dupont. Of course, it will be appreciated that there are many other plastic materials that also may be used in connection with example embodiments of this invention.

As alluded to above, composite materials and/or composite ribs also may be formed. That is, the material itself may be a composite material, or a rib may have a main body of a first material and secondary features of a second material. For example, certain example embodiments may include a steel rib that is insert-molded with plastic features.

Depending on the rib material and coefficients of thermal expansion (CTE), a polymer-based adhesive system of appropriate stiffness may be used to bond the rib(s) of certain example embodiments to the glass backing of the mirror panel. The adhesive stiffness may be chosen such that it accommodates the expected mismatch of expansion between the glass and the rib(s). In other words, the adhesives may be somewhat flexible so that as the glass and the rib(s) expand and/or contract relative to one another, such parts do not become de-bonded from one another. As a result, certain example embodiments may use glass-filled plastics and/or steel as preferred materials, as their respective coefficients of thermal expansion perhaps best match that of glass. Example adhesives usable in connection with certain example embodiments include polyurethane, which may be moisture-cured or two-part reactive mixed urethane systems; epoxy; silicone; and/or other like adhesives.

In this regard, the inventors of the instant application have discovered that urethane adhesives work extremely well with the bonding of the ribs to the glass surface. These urethane adhesives may be a 2-part nature, e.g., a physical mixing of an isocyanate component with a polyol component. Examples of these types of 2-part urethane adhesive are commercially available from Dow Automotive under the trade name of Betamate Structural Adhesive or from Ashland Chemical under the trade name of Pliogrip Structural Adhesives. Of course, it will be appreciated that there may be a much larger selection of commercial products available that could be substituted for the above mentioned commercial products.

Another branch of acceptable urethane adhesives are those urethane adhesives known as moisture-cured adhesives. Generally speaking, these adhesives cure by absorbing moisture from the ambient air and the absorbed moisture reacts with the adhesive to polymerize and cross link. An excellent example moisture-cured adhesive is Dow Automotive's Betaseal 16070. This adhesive is an advantageous choice, in part, because of its enhanced UV stability. There are many other commercially available moisture cured adhesives available from companies such as, for example, 3M, SIKA, Ashland Chemical, Eftec, YH America, among others.

It also is possible to use other adhesive types in certain example embodiments, such as those adhesives based upon epoxy chemistry, acrylate chemistries, etc. The choice of adhesive may be driven by several factors including, for example, the types of materials being bonded, the production friendliness of the adhesive system, etc.

The rib(s) may be formed to closely match the contours of the panel. In other words, the rib(s) may be formed to match the desired curvature of the panel. Such a construction helps to reduce the likelihood of debonding and/or increases the likelihood of the parts remaining bonded to one another. To accommodate such designs, glass filled plastic ribs may be molded to the appropriate shape(s), whereas steel ribs may be roll formed.

Any ribs being attached to the panel may be suitably prepared for bonding and longevity. In this regard, in certain example embodiment, the ribs may be e-coated, as e-coating such ribs generally is known to reduce the need for further priming for a polymer-based adhesive. As is known, e-coating, in general, is used to deposit a paint or lacquer coating on a part. In e-coating, parts are dipped into a vat of the lacquer or paint and are electrified so as to promote a reaction at the surface, which deposits the paint. It will be appreciated that e-coating advantageously may facilitate the bonding of one epoxy to another epoxy.

To help ensure long term bonding, primers or adhesion promoters may be applied to the various materials being bonded together in certain example embodiments of this invention. Metal primers include the use of e-coated metals, as described above. The e-coat paint is considered a primer system, and the e-coated surface readily bonds to urethane adhesive, e.g., when the e-coated surface has been properly produced in manufacturing and as long as the e-coated surface has been kept dry and clean. An acceptable e-coat supplier is PPG Coatings, which supplies a Powercron series of e-coats. Dupont Chemical also provides e-coat materials that have been tested and found acceptable.

If a metal rib is not e-coated, chemical primers may be applied to the metal prior to the application of the adhesive. These chemical primers generally comprise a 2-part priming operation. The first priming step will generally be the application of a metal primer that has a very high percentage of aggressive solvents to remove any organic contaminates from the surface of the metal. These first step metal primers will also generally contain an organosilane component which will chemically bond the metallic substrate. Although is may be possible to apply the adhesive to this first primer layer, especially when steel is the substrate, it is generally consider better practice to apply another urethane based primer over the top of the first primer. Acceptable metal primer systems include, for example, the use of Dow Automotive Metal Primer 435-21 followed by Dow Automotive Betaprime 435-32. Other commercially available metal primer systems are available from Ashland Chemical, Eftec, and other chemical suppliers.

Likewise, to ensure long term bond durability, the surface of the glass being adhered may be primed. These glass primers may be of a 1-part primer system or a 2-part primer system. A preferred 1-part glass primer system is Dow Automotive Uniprime 16100. This adhesive developed to be used with this glass primer is Dow Automotive Betaseal 16070. Other 1-part glass primer systems available such as YH America's PC3 glass primer among others also may be used in connection with certain example embodiments. Generally, the performance of a 1-part glass primer system is greatly enhanced if the glass surface to be primed is first cleaned with a solution of IPA and water. The 2-part glass primer systems generally comprise the first glass primer containing a high percentage of solvents along with a small percentage of a chemical coupler molecule such as organosilane. This first glass primer is applied to the glass surface and wets-out the glass surface for a specified period of time. Then, any excessive glass primer is wiped away with a clean dry cloth or other appropriate material. Next, a second primer is applied over the first primed area. This second primer will generally comprise blackened, moisture-cured urethane primer. A preferred example 2-part glass primer system is Dow Automotive Betaprime 435-18 and Dow Automotive Betaprime 435-20A. There are a multitude of other possible 2-part glass primer chemical systems available from companies such as Eftec and Ashland Chemical, among others.

The rib material also may be primed if is fabricated from a plastic substrate. Preferable plastic primers include the Dow Automotive Uniprime 16100 primer if the Ticona Celstran PUG 30 plastic is used. Depending upon the plastic used in the rib, other appropriate plastic primers include Dow Automotive's 435-32, 3M's 4296, 3M's 4298, etc.

As noted above, glass or laminated glass reflector panels may have mounting pads bonded to their surface. The stiffening ribs of certain example embodiments, however, may be used to reduce and sometimes even eliminate the need for separate mounting pads. This is related, in part, to the ability to include mounting features into the ribs themselves. For example, in certain example embodiments, the ribs may include threaded inserts, e.g., so as to help provide a connection between the reflector panels and its supporting structure(s). The inclusion of mounting features, in general, advantageously may help facilitate the manufacturing and/or assembly process(es), e.g., by helping to avoid processing steps, the creation and subsequent connection of additional separate mounting features, etc.

The stiffening rib(s) of certain example embodiments may be applied to any number of locations of a mirror. For example, the stiffening rib(s) of certain example embodiments may be applied on the back of the mirror (e.g., the side away from the light source) through one or more central areas thereof. In addition or in the alternative, the stiffening rib(s) of certain example embodiments may be applied around the periphery of the mirrors. It will be appreciated that "periphery" as used herein does not necessarily mean absolute edge but, rather, includes areas within a few millimeters, centimeters, or inches from the absolute periphery of the object. Furthermore, the stiffening rib(s) of certain example embodiments may be applied in rows and/or columns, in stripes, in circles, in concentric circle patterns, etc. In certain example embodiments, a single stiffening rib sized may be provided to a single mirror. Such a stiffening rib may be smaller than or substantially the same size as the mirror itself.

In general, the number, location, arrangement, etc., of the stiffening rib(s) to be attached to a mirror or array of mirrors may be determined experimentally, e.g., using a wind tunnel test. Indeed, an EI value typically associated with solar-type applications is about 918-1,090 pascal meters$^4$. In certain example embodiments, through the inclusion of one or more appropriately sized, shaped, and/or positioned stiffening rib(s), the level of stiffness may be increased. For example, the level of stiffness may be increased, preferably to about 9,180-14,350 pascal meters$^4$. In general, an order of magnitude (e.g., at least 10 times) increase in stiffness is desirable and achievable using the techniques described herein. In other words, an EI value of at least about 10,900 pascal meters$^4$ generally would be both most preferred and advantageous.

In view of the above, it will be appreciated that the increase in stiffness may be measured as either relative to the assembly without the inclusion of stiffening ribs, or as an absolute value. In the former case, an increase in stiffness of at least about 10 times generally would be advantageous. In the latter case, an increase in stiffness to at least about 10,900 pascal meters$^4$ generally would be advantageous. Of course, it will be appreciated that higher stiffness values may be achievable in certain example embodiments, and it also will be appreciated that lower stiffness values may be acceptable depending on the conditions actually, or expected to be, encountered.

Certain example embodiments described herein advantageously may help to reduce delamination and/or breakdown of the solar reflector components over time. This may be facilitated, in part, by selecting materials with appropriate CTEs. For example, at least two of the laminated or monolithic mirror, the stiffening rib(s), and the adhesive may be CTEs that are fairly close to one another. Preferably, at least two of the three aforementioned components will have CTEs that preferably are within about 50% of one another, more preferably within about 33% of one another, still more preferably within about 25% of one another, still more preferably within about 20% of one another, still more preferably within about 15% of one another, and still more preferably within about 10% of one another.

UV penetration may be reduced in the laminated components of certain example embodiments. For example, the inclusion of an optional polyvinyl butyral (PVB) laminate may help to filter UV radiation and thus reduce the amount of UV radiation reaching the adhesive(s) used to bond the rib(s) to the collector(s). For example, a PVB laminating layer may block more than about 99% of UV radiation having a wavelength of about 325-340 nm, which would be effective to reduce the amount of degradation of urethane and/or prolong the life of a urethane-based bond between the components. In general, using the techniques described herein, for example, certain example embodiments described herein may be durable enough to survive a 10-30 year or so period in a desert climate.

Figure 20A:
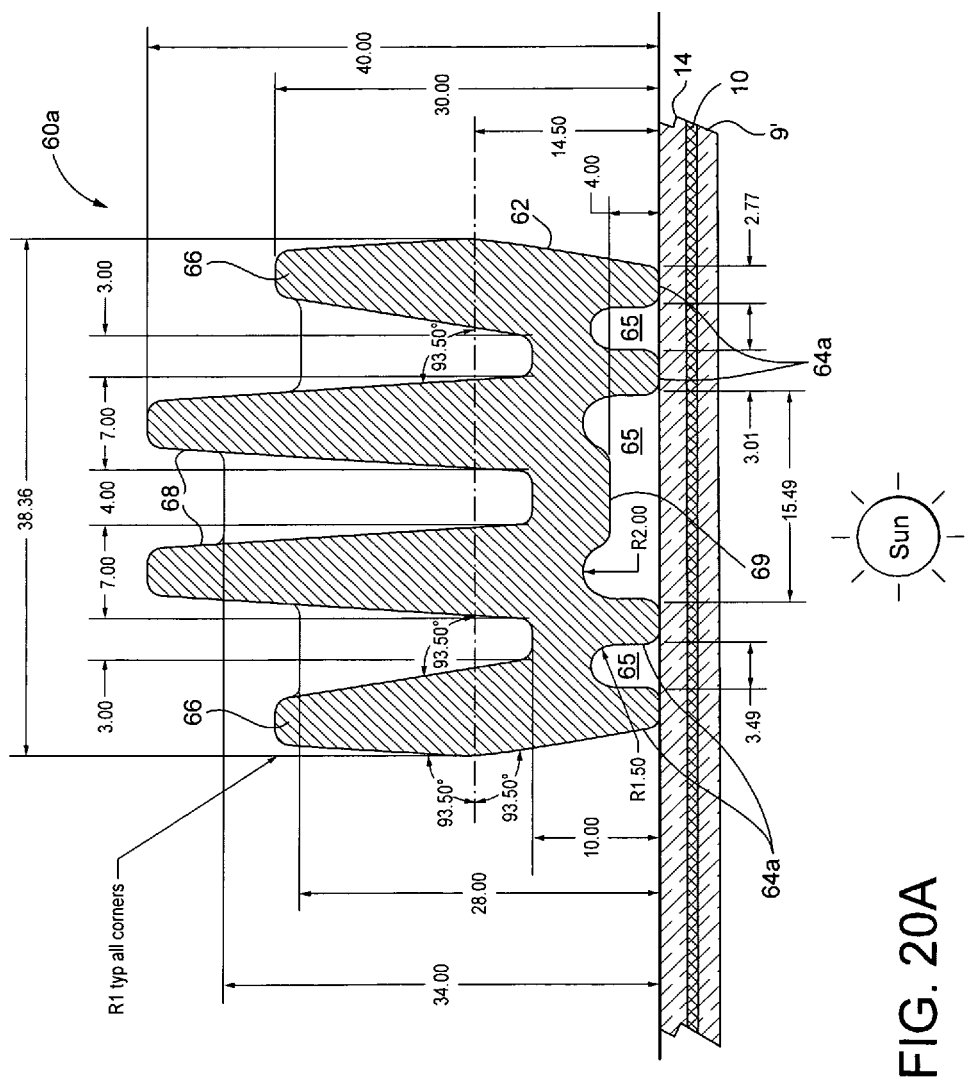
FIGS. 20*a* and 20*b* are cross-sectional views of stiffening ribs according to certain example embodiments of this invention.
Figure 20B:
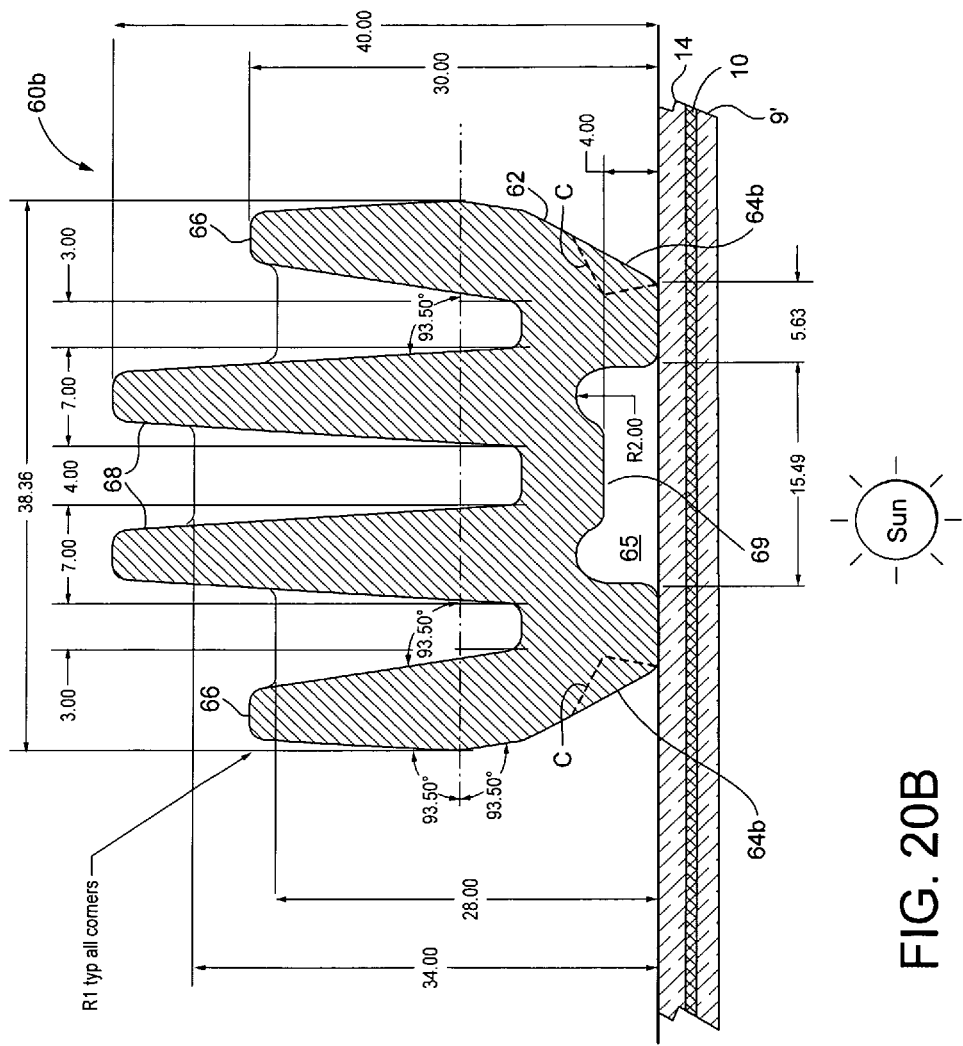

FIGS. 20a and 20b are cross-sectional views of stiffening ribs according to certain example embodiments of this invention. More particularly, the FIG. 20a example embodiment shows a stiffening rib 60a having a main body 62. A number of spaced apart finger-like protrusions 64a protrude towards the laminated article from the main body 62. The finger-like protrusions 64a contact, directly or indirectly, the substrate 14 and thus add stiffness thereto. Adhesive material may be provided in the spaces or gaps 65 between the finger-like protrusions 64a. The example embodiment shown in FIG. 20a includes four finger-like protrusions 64a and thus includes three spaces or gaps 65 where adhesive may be applied. It will be appreciated that more or fewer finger-like protrusions 64a may be included in certain example embodiments.

A tab-like protrusion 69 also may protrude towards the laminated article from the main body 62. This tab-like protrusion 69 may provide a further, substantially flat surface, thereby helping to bond the stiffening rib 60a to the substrate 14. In certain example embodiments, an opening or aperture (not shown) also may be formed in the tab-like protrusion 69, thereby allowing light to be focused in this area for solar collection and/or use.

Additional finger-like protrusions 66 and 68 may protrude from the main body 62 of the rib 60a. These finger-like protrusions 66 and 68 may protrude from a side of the main body 62 of the rib 60a opposite the finger-like protrusions 64a. For example, as shown in the FIG. 20a example embodiment, two shorter, outer finger-like protrusions 66 are provided at opposing ends of the stiffening rib 60a, whereas two inner, longer finger-like protrusions 68 are provided interior to the two shorter, outer finger-like protrusions 66 and spaced away from a center line of the rib 60a. Such an arrangement advantageously may allow for the optional opening or aperture (not shown) to be provided, along with any necessary hoses, chambers, engines, etc. In addition, or in the alternative, such an arrangement advantageously may be used as mounting features (e.g., as alluded to above), for example, allowing for a simplified connection to an underlying support structure.

Although the finger-like protrusions 66 and 68 are shown as being differently sized and oriented, the present invention is not so limited. In other words, the same or similar finger-like protrusions may be used in place of differently sized and/or shaped protrusions 66 and 68. Additionally, although two outer finger-like protrusions 66 and two inner finger-like protrusions 68 are shown, more or fewer of either or both may be implemented in connection with certain example embodiments.

The FIG. 20b example embodiment is similar to the FIG. 20a example embodiment, in that it shows a stiffening rib 60b having a main body 62 similar to the stiffening rib 60a. However, the FIG. 20b example embodiment includes only two finger-like protrusions 64b contacting, directly or indirectly, the substrate 14. These finger-like protrusions 64b of FIG. 20b are wider than the finger-like protrusions 64a of FIG. 20a. This enables fewer fingers to be implemented with the same or similar increase in overall stiffness. The two finger-like protrusions 64b of the FIG. 20b example embodiment may be cut, for example, along cut lines C. The removal of this additional material advantageously may make the ribs lighter while still conveying suitable increases in stiffness and/or bonding surfaces.

It will be appreciated that the stiffening ribs of certain example embodiments may be substantially elongate, circular, or otherwise suitably shaped. Additionally, the dimensions provided in FIGS. 20a and 20b are provided by way of example, and it will be appreciated that the stiffening ribs may be formed to any suitable dimension.

Figure 21:
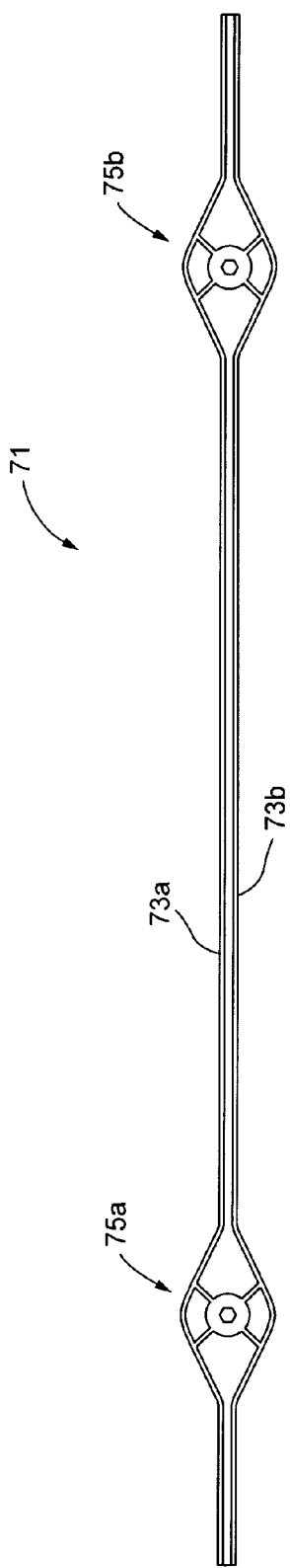
FIG. 21 is a top view of a rail mount assembly according to certain example embodiments of this invention.

FIG. 21 is a top view of a rail mount assembly 71 according to certain example embodiments of this invention. The rail mount assembly 71 includes first and second rails 73a and 73b. The first and second rails 73a and 73b are substantially parallel to one another, except where mounting pads 75a and 75b are formed. These mounting pads are similar in structure and function to those shown in FIGS. 18a and 18b. However, mounting pads 75a and 75b may have the stiffening rib(s) of certain example embodiments located thereunder (e.g., on a side thereof opposite the sun). Optionally, the mounting pads 75a and 75b may have mounting features that correspond with those provided to the stiffening ribs. For example, they may include corresponding protrusions and recessions for engaging with the stiffening ribs (e.g., as shown in FIGS. 20a and 20b), may include latching mechanisms, screw mechanisms, etc.

It will be appreciated that other mounting pads, other rail assemblies, troughs, arrays, etc., may be used in connection with certain example embodiments. Also, it will be appreciated that the example stiffening rib techniques described herein may be used with any kind of reflector (e.g., mirror) for use in a solar collector or the like. For example, it will be appreciated that the example stiffening rib techniques described herein may be used with flat, parabolic, spherical, or otherwise shaped and/or arranged laminated or monolithic mirror panels. Such mirrors may be bent according to the example techniques described herein, or in other conventional ways.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A stiffening rib for a reflector in a solar collector system, comprising:
    at least one area suitable for accommodating a polymer-based adhesive for bonding the rib to a side of the reflector facing away from the sun,
    wherein the stiffening rib is formed so as to substantially match a contour of the reflector, wherein at least two of the rib, the reflector, and the adhesive have respective coefficients of thermal expansion within about 50% of one another, and wherein the stiffening rib is sized and positionable on the reflector so as to increase an EI value of the reflector at least about 10 times or to at least about 9,180 pascal meters$^4$, wherein the EI value is the value of the product of the Young's modulus, E, of the reflector and the second moment of area, I, of the reflector with respect to an axis of the reflector, the stiffening rib further comprising:

a main body;

at least two first spaced apart protrusions extending from the main body arranged to directly or indirectly contact the reflector, the space(s) between each said first protrusions being the at least one area suitable for accommodating a polymer-based adhesive; and at least two second spaced apart protrusions extending from the main body in opposite the at least two first spaced apart protrusions, the at least two second spaced apart protrusions being configured to engage with corresponding mounting features provided to the solar collector system.

2. The stiffening rib of claim 1, wherein
the stiffening rib is sized and positionable on the reflector so as to increase an EI value of the reflector to at least about 10,900 pascal meters$^4$.

3. The stiffening rib of claim 1, wherein
the stiffening rib is made from roll-formed steel, an injection molded plastic or glass-filled plastic, or extruded aluminum.

4. The stiffening rib of claim 1, wherein
at least two of the rib, the reflector, and the adhesive have respective coefficients of thermal expansion within about 25% of one another.

5. The stiffening rib of claim 1, wherein
the rib is e-coated.

6. The stiffening rib of claim 1, further comprising at least one mounting feature configured to engage with corresponding mounting features provided to the solar collector system.

7. A solar collector system including a plurality of reflectors, each said reflector having a stiffening rib associated therewith and attached thereto on a side facing away from the sun, each said stiffening rib comprising:

at least one area suitable for accommodating a polymer-based adhesive for bonding the rib to a side of the associated reflector facing away from the sun, wherein each said stiffening rib is formed so as to substantially match a contour of the associated reflector, wherein at least two of each said rib, the associated reflector, and the adhesive have respective coefficients of thermal expansion within about 50% of one another, and wherein each said stiffening rib is sized and positioned on the associated reflector so as to increase an EI value thereof at least about 10 times or to at least about 9,180 pascal meters$^4$, wherein the EI value is the value of the product of the Young's modulus, E, of the associated reflector and the second moment of area, I, of the associated reflector with respect to an axis of the reflector, each said stiffening rib further comprising a main body;

at least two first spaced apart protrusions extending from the main body arranged to directly or indirectly contact the associated reflector, the space(s) between each said first protrusions being the at least one area suitable for accommodating the polymer-based adhesive; and at least two second spaced apart protrusions extending from the main body in opposite the at least two first spaced apart protrusions, the at least two second spaced apart protrusions being configured to engage with corresponding mounting features provided to the solar collector system.

8. The solar collector system of claim 7, wherein
each stiffening rib is sized and positioned on the associated reflector so as to increase an EI value thereof to at least about 10,900 pascal meters$^4$.

9. The solar collector system of claim 8, wherein
each said stiffening rib is bonded to the associated reflector at an approximate center section of the associated reflector.

10. The solar collector system of claim 8, wherein
each said stiffening rib is bonded to its associated reflector around the periphery of the associated reflector.

11. The solar collector system of claim 7, wherein
each said stiffening rib is made from roll-formed steel, an injection molded plastic or glass-filled plastic, or extruded aluminum.

12. The solar collector system of claim 7, wherein
at least two of the rib, the associated reflector, and the adhesive have respective coefficients of thermal expansion within about 25% of one another.

13. The solar collector system of claim 7, wherein
each said rib is e-coated.

14. The solar collector system of claim 7, wherein
each said rib further comprises at least one mounting feature configured to engage with corresponding mounting features provided to the solar collector system.

15. The solar collector system of claim 7, wherein
the adhesive is at least one of: a moisture-cured or two-part reactive mixed urethane system, an epoxy, or silicone.

16. The solar collector system of claim 7, wherein
the adhesive bonding each said rib to the associated reflector is sufficiently to last about 10-30 year period in a desert climate.

17. The solar collector system of claim 7, wherein
each said reflector is flat, parabolic, or spherical.

18. The solar collector system of claim 7, wherein
each said reflector is either a laminated or monolithic mirror panel.

19. The solar collector system of claim 7, wherein
each said reflector is a laminated mirror panel include polyvinyl butyral.

20. The stiffening rib of claim 1, wherein
the stiffening rib is a composite material rib.

21. The stiffening rib of claim 20, wherein
the composite material rib comprises a steel rib body that is insert-molded with plastic features.

* * * * *